US010170950B2

(12) United States Patent
Sakaue et al.

(10) Patent No.: US 10,170,950 B2
(45) Date of Patent: Jan. 1, 2019

(54) ROTARY ELECTRIC MACHINE AND METHOD FOR MANUFACTURING AN ARMATURE THAT IS USED IN THE ROTARY ELECTRIC MACHINE

(71) Applicants: Atsushi Sakaue, Tokyo (JP); Hironori Tsuiki, Tokyo (JP); Hiroyuki Akita, Tokyo (JP); Akira Hashimoto, Tokyo (JP)

(72) Inventors: Atsushi Sakaue, Tokyo (JP); Hironori Tsuiki, Tokyo (JP); Hiroyuki Akita, Tokyo (JP); Akira Hashimoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 712 days.

(21) Appl. No.: 14/759,561

(22) PCT Filed: Jan. 9, 2013

(86) PCT No.: PCT/JP2013/050198
§ 371 (c)(1),
(2) Date: Jul. 7, 2015

(87) PCT Pub. No.: WO2014/109015
PCT Pub. Date: Jul. 17, 2014

(65) Prior Publication Data
US 2015/0349597 A1 Dec. 3, 2015

(51) Int. Cl.
*H02K 3/24* (2006.01)
*H02K 3/12* (2006.01)
(Continued)

(52) U.S. Cl.
CPC .............. *H02K 3/12* (2013.01); *H02K 3/28* (2013.01); *H02K 15/0435* (2013.01); *H02K 1/16* (2013.01);
(Continued)

(58) Field of Classification Search
CPC ............ H02K 1/16; H02K 1/165; H02K 1/27; H02K 1/276; H02K 1/28; H02K 3/12;
(Continued)

(56) References Cited

U.S. PATENT DOCUMENTS

2005/0073208 A1 4/2005 Mitcham
2008/0174199 A1 7/2008 Ishigami et al.
(Continued)

FOREIGN PATENT DOCUMENTS

| JP | 5040303 B2 | 10/2012 |
|---|---|---|
| WO | WO 03/081749 A1 | 10/2003 |
| WO | WO 2011/055438 A1 | 5/2011 |

OTHER PUBLICATIONS

Watanabe et al., JP 2012-125043 w/ English Translation, Jun. 28, 2012.*
(Continued)

*Primary Examiner* — Bernard Rojas
*Assistant Examiner* — Rashad Johnson
(74) *Attorney, Agent, or Firm* — Buchanan Ingersoll & Rooney PC

(57) ABSTRACT

First and second winding bodies are each configured so as to have a helical shape by winding a conductor wire for m turns, where m is a natural number that is greater than or equal to two, an armature winding is configured by mounting two-lane winding bodies into respective pairs of slots, two-lane winding bodies being configured by assembling the first and second winding bodies, the coil ends include a top portion that displaces in a radial direction at a central
(Continued)

portion, and the radial displacement at the top portion is a×d, where a is a natural number that is greater than or equal to 2 and less than or equal to 2×(m−1), and d is a radial thickness of the rectilinear portions, 4×m of the rectilinear portions being housed inside the slots so as to line up in single columns.

18 Claims, 17 Drawing Sheets

(51) Int. Cl.
    *H02K 15/04* (2006.01)
    *H02K 3/28* (2006.01)
    *H02K 3/34* (2006.01)
    *H02K 1/27* (2006.01)
    *H02K 1/16* (2006.01)

(52) U.S. Cl.
    CPC ............ *H02K 1/165* (2013.01); *H02K 1/27* (2013.01); *H02K 1/276* (2013.01); *H02K 3/34* (2013.01); *H02K 3/345* (2013.01); *Y10T 29/49011* (2015.01)

(58) Field of Classification Search
    CPC ............ H02K 3/28; H02K 3/34; H02K 3/345; H02K 15/12; H02K 15/0435; Y10T 29/49011
    USPC .......... 310/154.07, 156.21, 198, 215; 29/596
    See application file for complete search history.

(56) References Cited

U.S. PATENT DOCUMENTS

| | | | |
|---|---|---|---|
| 2010/0141078 A1* | 6/2010 | Kouda | H02K 3/12 310/195 |
| 2010/0148621 A1* | 6/2010 | Ishizuka | H02K 3/12 310/201 |
| 2012/0025658 A1* | 2/2012 | Watanabe | H02K 3/12 310/179 |
| 2012/0223611 A1 | 9/2012 | Watanabe et al. | |
| 2015/0162787 A1* | 6/2015 | Sakaue | H02K 1/148 310/195 |
| 2015/0171693 A1* | 6/2015 | Sakaue | H02K 3/38 310/215 |
| 2016/0268860 A1* | 9/2016 | Tsuiki | H02K 3/12 |

OTHER PUBLICATIONS

International Search Report (PCT/ISA/210) dated Apr. 16, 2013, by the Japanese Patent Office as the International Searching Authority for International Application No. PCT/JP2013/050198.

* cited by examiner

ROTARY ELECTRIC MACHINE AND METHOD FOR MANUFACTURING AN ARMATURE THAT IS USED IN THE ROTARY ELECTRIC MACHINE

TECHNICAL FIELD

The present invention relates to a rotary electric machine, such as an electric motor or a generator, and to a method for manufacturing an armature that is used in the rotary electric machine.

BACKGROUND ART

In recent years, compactness, high output, and high quality have been required in rotary electric machines such as electric motors or generators. With regard to downsizing rotary electric machines of this kind, stator windings that have concentrated windings that are configured by winding conductor wires onto individual stator core teeth have been used with a view to downsizing coil ends, which do not generate effective magnetic flux. However, stators that use stator windings of distributed winding construction that can suppress torque pulsation and increase output are in demand. In addition, demand for induction machines that do not use magnets has also increased due to steep rises in magnet prices, and there is demand for stators that use higher-efficiency distributed winding stator windings.

Now, in contrast to concentrated windings, which are configured by winding conductor wires onto individual teeth, windings that are configured by winding conductor wires into pairs of slots that are separated by greater than or equal to two slots are designated "distributed windings". In other words, distributed windings are configured such that a conductor wire that extends outward from one slot is wound around a slot pair for a plurality of turns so as to span two or more consecutive teeth and enter another slot.

In conventional rotary electric machines such as that described in Patent Literature 1, winding coils that are formed into a coil shape by winding a rectangular conductor wire a plurality of times, also known as "hexagonal coils", are housed in respective pairs of slots that are separated by a predetermined number of slots, and predetermined hexagonal coils are connected by crossover wires that are disposed outside coil end groups to constitute a distributed winding stator winding.

CITATION LIST

Patent Literature

Patent Literature 1: Japanese Patent No. 5040303 (Gazette)

SUMMARY OF THE INVENTION

Problem to be Solved by the Invention

Because conventional rotary electric machines such as that described in Patent Literature 1 have been configured such that hexagonal coils are inserted into bottom portions of a first slot and opening portions of a second slot in the pairs of slots that are separated by a predetermined number of slots by forming vertex portions that are positioned at two axial ends of the hexagonal coils into crank shapes in which only width dimensions in a direction of alignment of conductor wires that constitute the hexagonal coils are offset, one problem has been that coil end groups are larger, making downsizing of the rotary electric machines unachievable.

The present invention aims to solve the above problems and an object of the present invention is to provide a compact rotary electric machine and a method for manufacturing an armature that is used in the rotary electric machine, by suppressing increases in coil end group dimensions.

Means for Solving the Problem

In order to achieve the above object, according to one aspect of the present invention, there is provided a rotary electric machine including an armature that is formed by mounting an armature winding to an annular armature core. A first winding body and a second winding body are each configured so as to have a helical shape in which end portions of rectilinear portions are linked by coil ends, by winding a jointless, continuous conductor wire that is coated with insulation for m turns, where m is a natural number that is greater than or equal to two; a two-lane winding body is configured by assembling the first winding body and the second winding body such that orbiting portions that are constituted by the rectilinear portions and the coil ends of the first winding body overlap in a radial direction with corresponding orbiting portions that are constituted by the rectilinear portions and the coil ends of the second winding body; the armature winding is configured by mounting the two-lane winding bodies into respective pairs of slots of the armature core that are separated by a predetermined number of slots; the coil ends include a top portion that displaces by a predetermined amount in a radial direction at an approximately central portion between the linked rectilinear portions; and the radial displacement at the top portion is approximately a×d, where a is a natural number that is greater than or equal to 2 and less than or equal to 2×(m−1), and d is a radial thickness of the rectilinear portions that are housed inside the slots, 4×m of the rectilinear portions of two of the two-lane winding bodies being housed inside the slots so as to line up in single columns in a radial direction.

Effects of the Invention

According to the present invention, because the amount of radial displacement at the top portions in the coil ends of the first and second winding bodies is less than the total sum (m×d) of the radial dimensions of the rectilinear portions of the two-lane winding bodies that are lined up in single columns radially, increases in radial and axial dimensions are suppressed in the coil end groups of the armature winding that is configured by mounting the two-lane winding bodies into respective pairs of slots of the armature core that are separated by a predetermined number of slots, enabling the rotary electric machine to be reduced in size.

DESCRIPTION OF EMBODIMENTS

Preferred embodiments of a rotary electric machine according to the present invention will now be explained with reference to the drawings.

Embodiment 1

Figure 1:
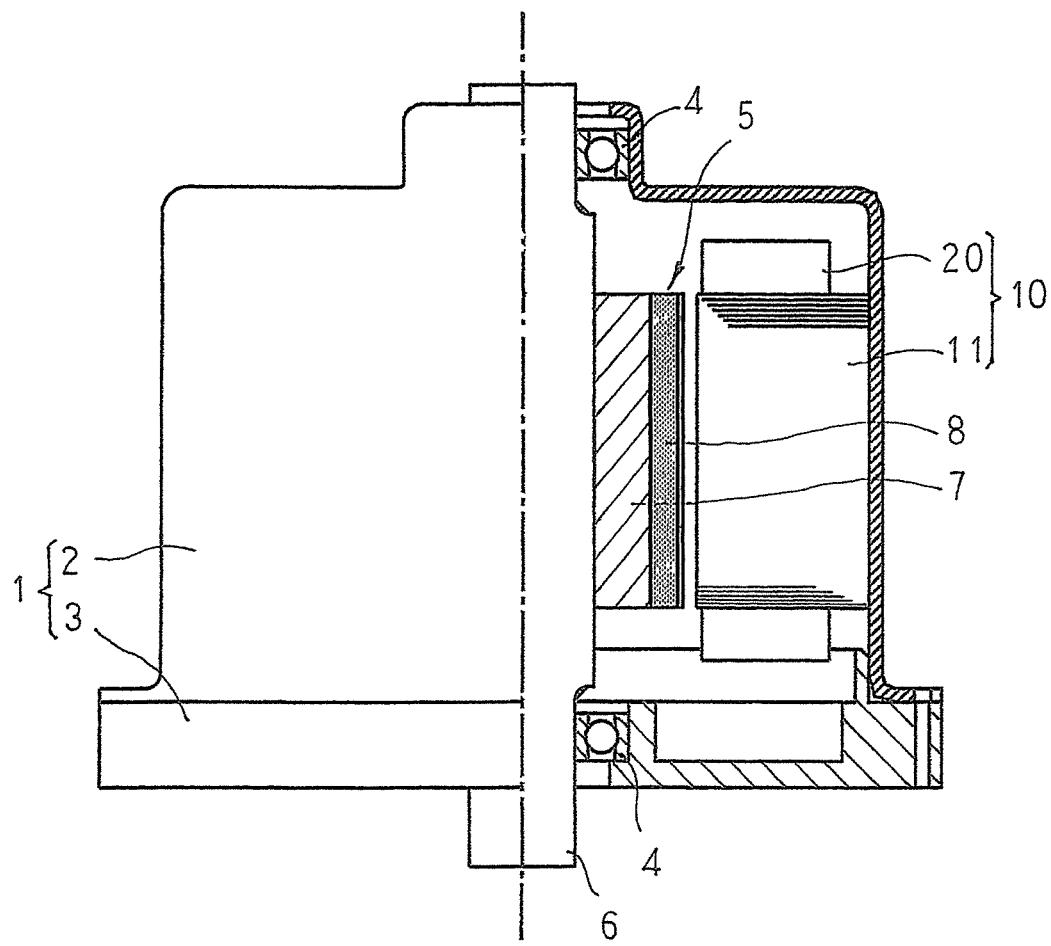
FIG. 1 is a half section that shows a rotary electric machine according to Embodiment 1 of the present invention.
Figure 2:
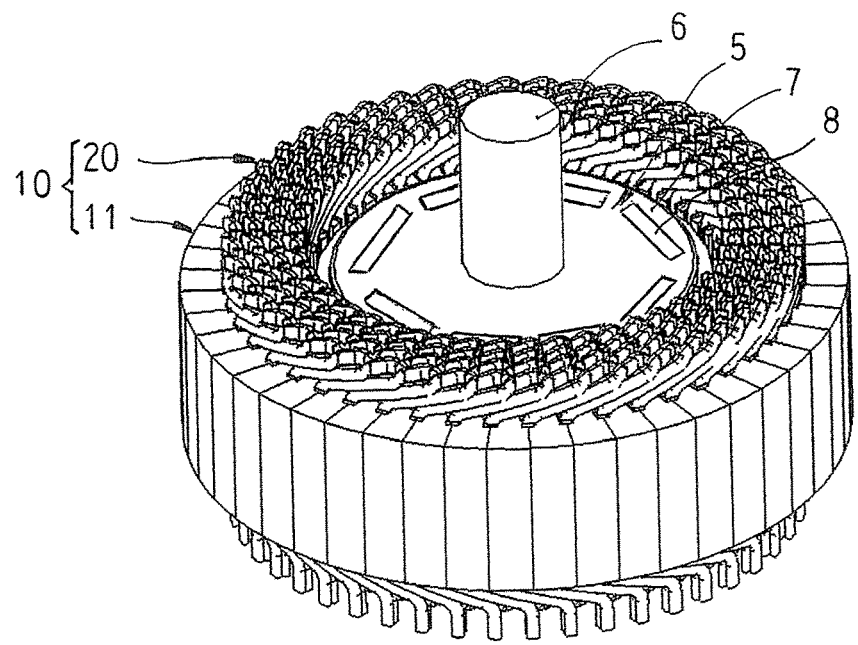
FIG. 2 is an oblique projection that shows part of the rotary electric machine according to Embodiment 1 of the present invention.
Figure 3:
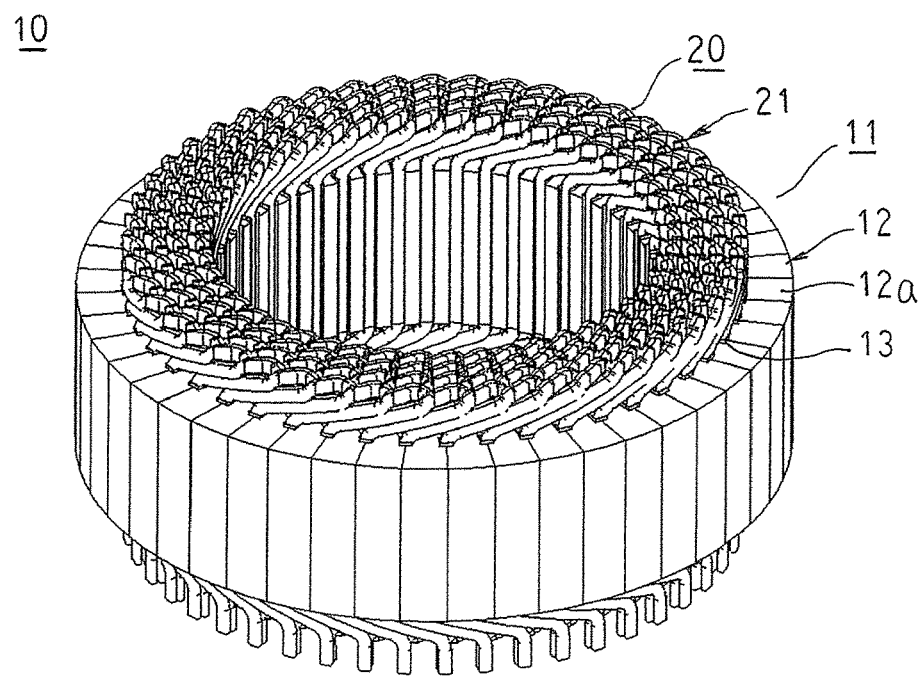
FIG. 3 is an oblique projection that shows a stator that is used in the rotary electric machine according to Embodiment 1 of the present invention.
Figure 4:
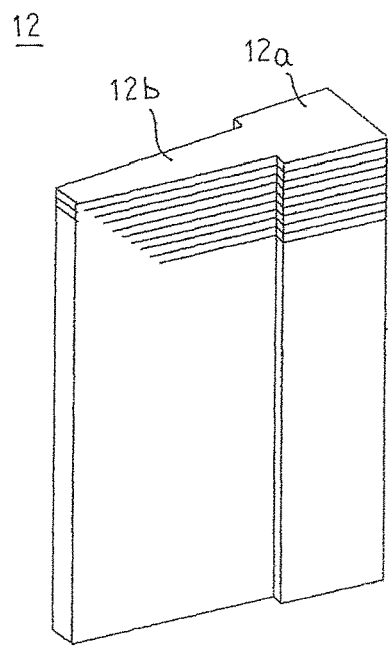
FIG. 4 is an oblique projection that shows a core block that constitutes a stator core that is used in the rotary electric machine according to Embodiment 1 of the present invention.
Figure 5:
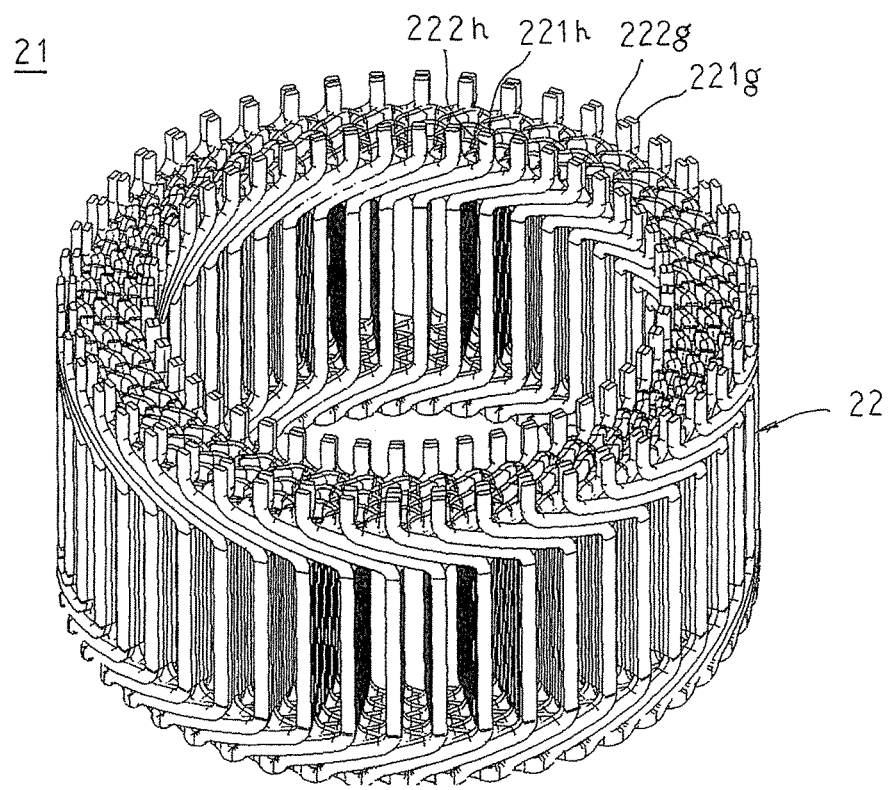
FIG. 5 is an oblique projection that shows a winding assembly that constitutes a stator winding that is used in the rotary electric machine according to Embodiment 1 of the present invention.
Figure 6:
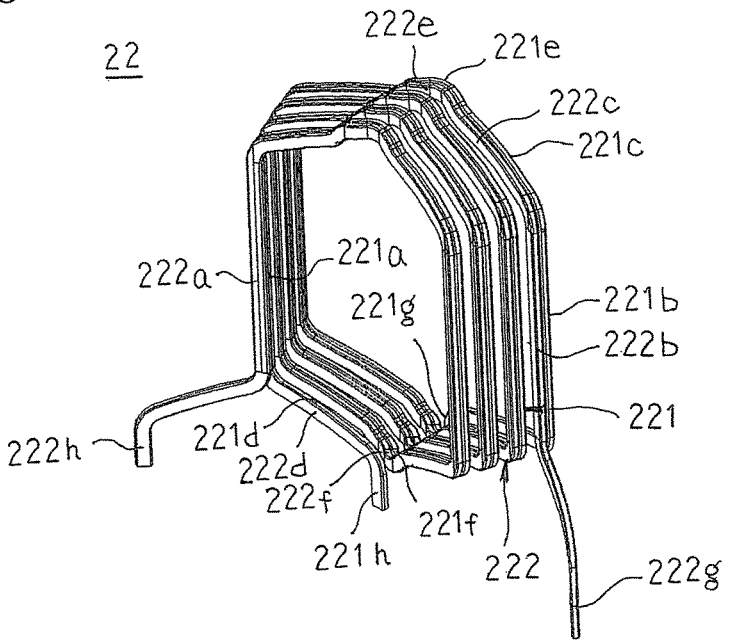
FIG. 6 is an oblique projection that shows a two-lane winding body that constitutes the winding assembly in the rotary electric machine according to Embodiment 1 of the present invention.
Figure 7:
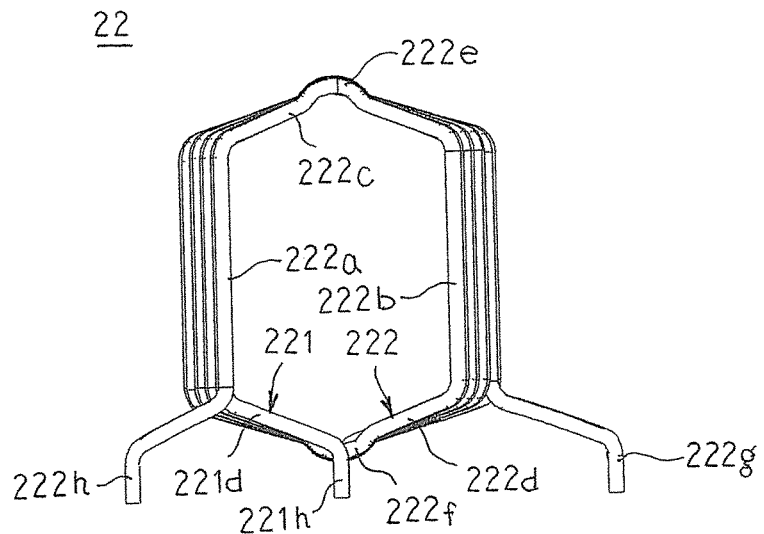
FIG. 7 is a front elevation that shows the two-lane winding body that constitutes the winding assembly in the rotary electric machine according to Embodiment 1 of the present invention.
Figure 8:
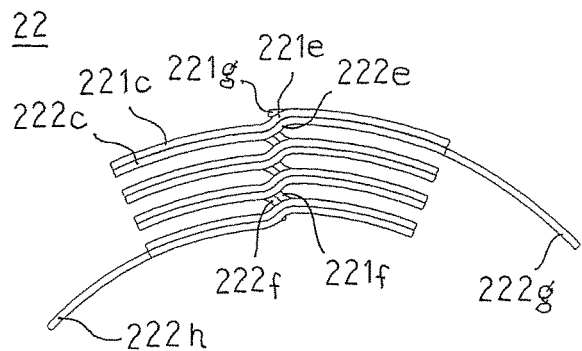
FIG. 8 is a plan that shows the two-lane winding body that constitutes the winding assembly in the rotary electric machine according to Embodiment 1 of the present invention.
Figure 9:
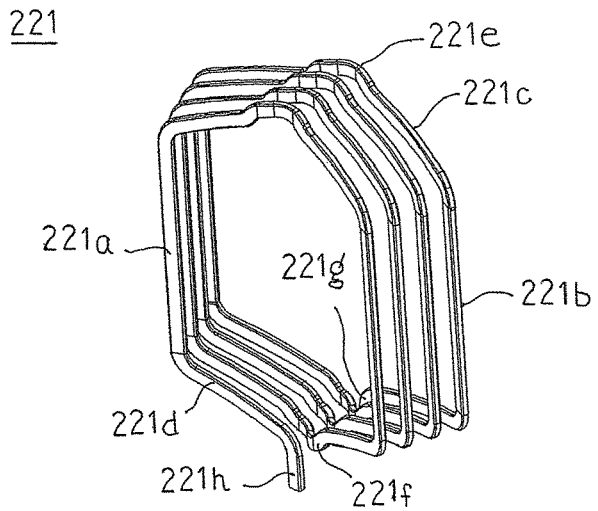
FIG. 9 is an oblique projection that shows a first winding body that constitutes the two-lane winding body in the rotary electric machine according to Embodiment 1 of the present invention.
Figure 10:
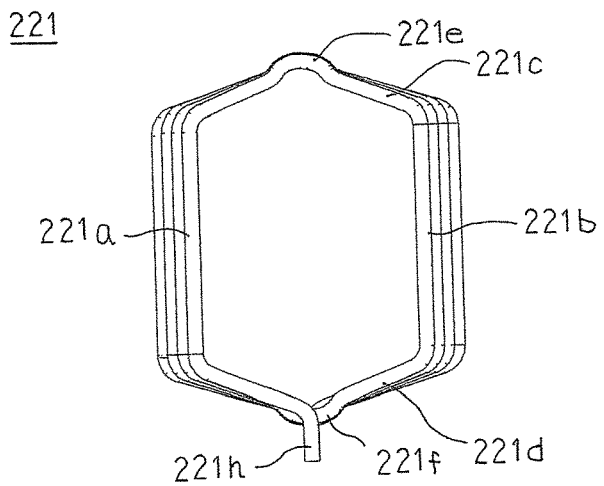
FIG. 10 is a front elevation that shows the first winding body that constitutes the two-lane winding body in the rotary electric machine according to Embodiment 1 of the present invention.
Figure 11:
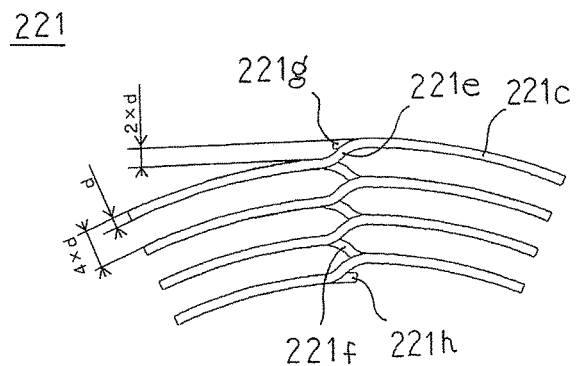
FIG. 11 is a plan that shows the first winding body that constitutes the two-lane winding body in the rotary electric machine according to Embodiment 1 of the present invention.
Figure 12:
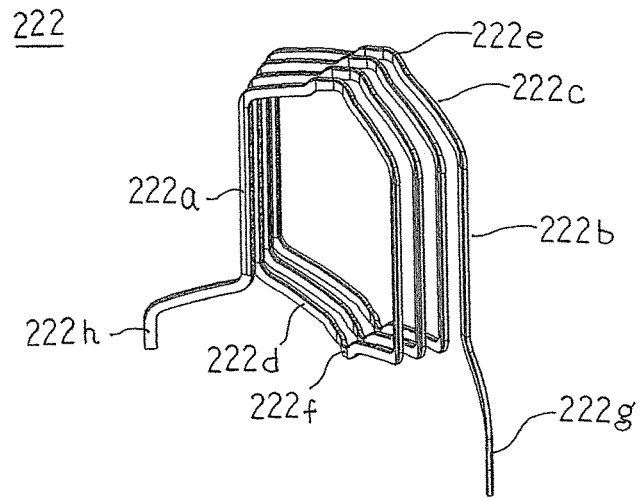
FIG. 12 is an oblique projection that shows a second winding body that constitutes the two-lane winding body in the rotary electric machine according to Embodiment 1 of the present invention.
Figure 13:
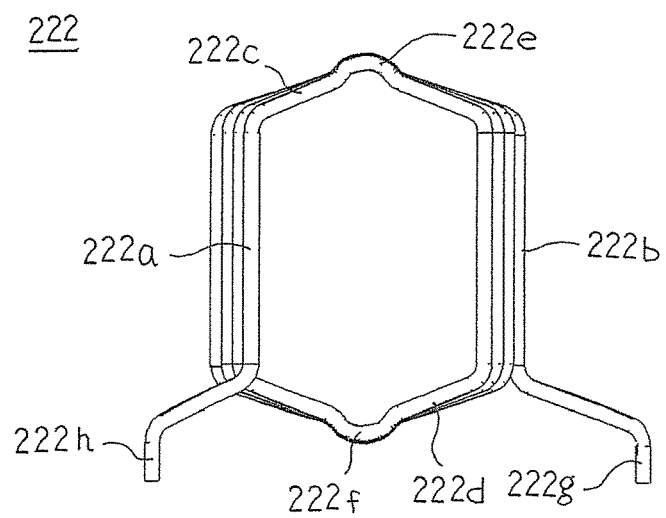
FIG. 13 is a front elevation that shows the second winding body that constitutes the two-lane winding body in the rotary electric machine according to Embodiment 1 of the present invention.
Figure 14:
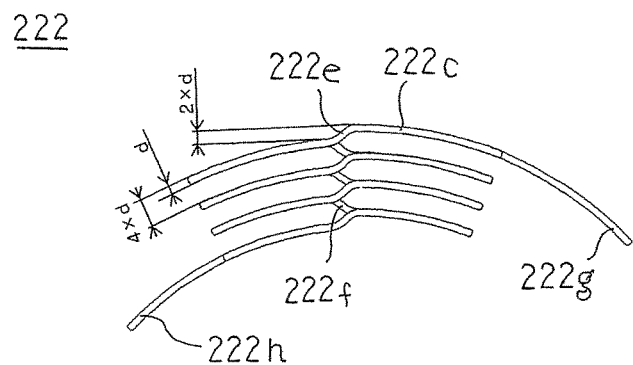
FIG. 14 is a plan that shows the second winding body that constitutes the two-lane winding body in the rotary electric machine according to Embodiment 1 of the present invention.
Figure 15:
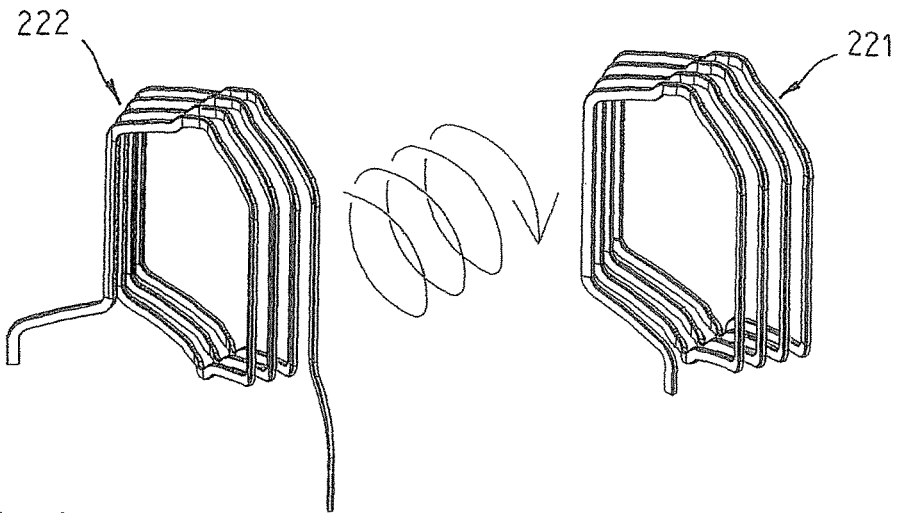
FIG. 15 is a diagram that explains a method for assembling the two-lane winding body according to Embodiment 1 of the present invention.
Figure 16:
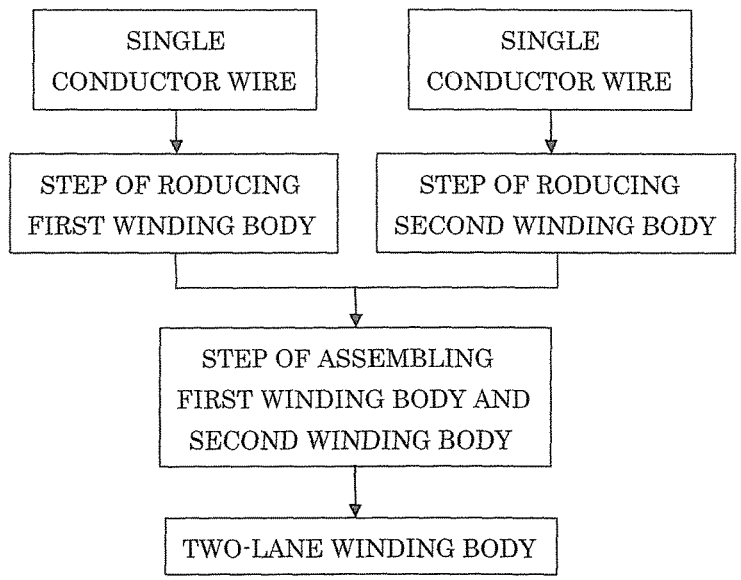
FIG. 16 is a chart that explains a method for manufacturing the two-lane winding body according to Embodiment 1 of the present invention.
Figure 17:
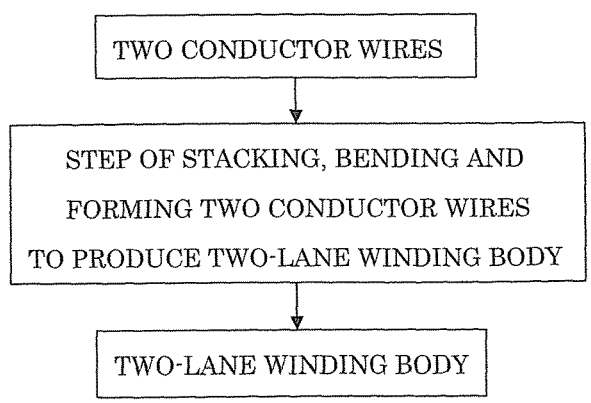
FIG. 17 is a chart that explains another method for manufacturing the two-lane winding body according to Embodiment 1 of the present invention.

FIG. 1 is a half section that shows a rotary electric machine according to Embodiment 1 of the present invention, FIG. 2 is an oblique projection that shows part of the rotary electric machine according to Embodiment 1 of the present invention, FIG. 3 is an oblique projection that shows a stator that is used in the rotary electric machine according to Embodiment 1 of the present invention, FIG. 4 is an oblique projection that shows a core block that constitutes a stator core that is used in the rotary electric machine according to Embodiment 1 of the present invention, FIG. 5 is an oblique projection that shows a winding assembly that constitutes a stator winding that is used in the rotary electric machine according to Embodiment 1 of the present invention, FIG. 6 is an oblique projection that shows a two-lane winding body that constitutes the winding assembly in the rotary electric machine according to Embodiment 1 of the present invention, FIG. 7 is a front elevation that shows the two-lane winding body that constitutes the winding assembly in the rotary electric machine according to Embodiment 1 of the present invention, FIG. 8 is a plan that shows the two-lane winding body that constitutes the winding assembly in the rotary electric machine according to Embodiment 1 of the present invention, FIG. 9 is an oblique projection that shows a first winding body that constitutes the two-lane winding body in the rotary electric machine according to Embodiment 1 of the present invention, FIG. 10 is a front elevation that shows the first winding body that constitutes the two-lane winding body in the rotary electric machine according to Embodiment 1 of the present invention, FIG. 11 is a plan that shows the first winding body that constitutes the two-lane winding body in the rotary electric machine according to Embodiment 1 of the present invention, FIG. 12 is an oblique projection that shows a second winding body that constitutes the two-lane winding body in the rotary electric machine according to Embodiment 1 of the present invention, FIG. 13 is a front elevation that shows the second winding body that constitutes the two-lane winding body in the rotary electric machine according to Embodiment 1 of the present invention, FIG. 14 is a plan that shows the second winding body that constitutes the two-lane winding body in the rotary electric machine according to Embodiment 1 of the present invention, FIG. 15 is a diagram that explains a method for assembling the two-lane winding body according to Embodiment 1 of the present invention, FIG. 16 is a chart that explains a method for manufacturing the two-lane winding body according to Embodiment 1 of the present invention, and FIG. 17 is a chart that explains another method for manufacturing the two-lane winding body according to Embodiment 1 of the present invention.

In FIGS. 1 and 2, a rotary electric machine 100 includes: a housing 1 that has: a floored cylindrical frame 2; and an end plate 3 that closes an opening of the frame 2; a stator 10 that functions as an armature that is fixed to a cylindrical portion of the frame 2 in an internally fitted state; and a rotor 5 that is fixed to a rotating shaft 6 that is rotatably supported in the floor portion of the frame 2 and the end plate 3 by means of bearings 4 so as to be rotatably disposed on an inner circumferential side of the stator 10.

The rotor 5 is a permanent-magnet rotor that includes: a rotor core 7 that is fixed to the rotating shaft 6, which is inserted through a central position thereof; and eight permanent magnets 8 that are embedded so as to pass through axially near an outer circumferential surface of the rotor core 7 so as to be arranged at a predetermined pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the stator 10 will be explained in detail with reference to FIGS. 3 through 8.

As shown in FIG. 3, the stator 10 includes: a stator core 11 that functions as an armature core; and a stator winding 20 that functions as an armature winding 20 that is mounted to the stator core 11. Here, to facilitate explanation, the number of poles in the rotor 5 is eight, the number of slots in the stator core 11 is forty-eight, and the stator winding 20 is a three-phase winding. In other words, the slots are formed on the stator core 11 at a ratio of two slots per phase per pole.

As shown in FIG. 4, core blocks 12 are made by dividing the annular stator core 11 into forty-eight equal sections circumferentially, and include: a core back portion 12a that has a circular arc-shaped cross section, that is produced by laminating and integrating a predetermined number of electromagnetic steel sheets; and a tooth 12b that is disposed so as to extend radially inward from an inner circumferential wall surface of the core back portion 12a. The stator core 11 is configured into an annular shape by arranging and integrating forty-eight core blocks 12 circumferentially by butting together circumferential side surfaces of the core back portions 12a such that the teeth 12b are oriented radially inward. The slots 13, which are formed by circumferentially adjacent core blocks 12, are arranged at a uniform angular pitch circumferentially so as to be open on an inner circumferential side. The teeth 12b are formed so as to have a tapered shape in which a circumferential width becomes gradually narrower radially inward, and a cross section of the slots 13 is oblong.

As shown in FIG. 3, the stator winding 20 is configured by applying a predetermined connection process to the winding assembly 21 that is mounted to the stator core 11. As shown in FIG. 5, the winding assembly 21 is configured by arranging two-lane winding bodies 22 that are housed in pairs of slots 13 that span six consecutive teeth 12b circumferentially at a pitch of one slot. Winding ends 221g and 222g (described below) each project axially outward from the winding assembly 21, and are arranged on a radially outer side of the winding assembly 21 at a pitch of one slot circumferentially. Winding ends 221h and 222h (described below) each project axially outward from the winding assembly 21, and are arranged on a radially inner side of the winding assembly 21 at a pitch of one slot circumferentially. A predetermined joining process is applied to the winding ends 221g and 222g, 221h, and 222h of the winding assembly 21.

The two-lane winding bodies 22 include a first winding body 221 and a second winding body 222 that are each configured by winding conductor wire that has an oblong cross section, that is made of jointless, continuous copper wire or aluminum wire that is coated with an insulating enamel resin, for four turns helically into an approximate hexagon shape so as to leave a constant spacing between each turn.

Here, the first winding bodies 221 and the second winding bodies 222 are produced by winding the conductor wire for four turns helically to produce a tubular coil body, and subsequently forming the coil body into an approximate hexagon shape using a coil forming machine, for example. Moreover, the first winding bodies 221 and the second winding bodies 222 may be produced by a folding and bending process so as to bend a conductor wire into an approximate hexagon shape while winding it helically.

Alternatively, depending on production facilities, as shown in FIG. 16, the first winding bodies 221 and the second winding bodies 222 may each be produced separately by supplying single conductor wires to a forming machine, and as described below, the two-lane winding bodies 22 may be assembled by mounting the second winding bodies 222 to the first winding bodies 221 while rotating them. In that case, the force that works the conductor wire is reduced, enabling manufacturing equipment to be reduced in size, and the occurrence of damage to the insulating coatings that are coated onto the conductor wire is also suppressed, enabling insulation performance of the winding bodies to be increased. Alternatively, as shown in FIG. 17, two-lane winding bodies 22 in which the first winding bodies 221 and the second winding bodies 222 are configured into a single body may be produced by supplying two conductor wires to the forming machine simultaneously. In that case, a step for assembling first winding bodies 221 and second winding bodies 222 that have been produced separately is no longer needed, increasing productivity.

As shown in FIGS. 9 through 11, the first winding bodies 221 include: first and second rectilinear portions 221a and 221b that form two columns that are separated by an angular pitch of six slots in which four of each are arranged in a direction of short sides of the oblong cross sections so as to leave gaps 3d in each of the columns; and first and second coil ends 221c and 221d that alternately link first longitudinal ends to each other and second longitudinal ends to each other between the columns of first and second rectilinear portions 221a and 221b. Moreover, d is a length of the short sides of the oblong cross sections of the conductor wires. An angular pitch of six slots is a pitch between slot centers of slots 13 on two sides of six consecutive teeth 12b, and corresponds to a pitch of one magnetic pole.

The first coil ends 221c extend outward at a predetermined inclination longitudinally outward relative to the first and second rectilinear portions 221a and 221b from first ends of first rectilinear portions 221a in a first column toward second rectilinear portions 221b in a second column, are displaced by a distance 2×d in a direction of arrangement of the first and second rectilinear portions 221a and 221b by being bent approximately at right angles at central portions (first top portions 221e) between the columns of the first and second rectilinear portions 221a and 221b, and are subsequently bent approximately at right angles and extend longitudinally inward relative to the first and second rectilinear portions 221a and 221b toward the second rectilinear portions 221b in the second column at a predetermined inclination, and are connected to first ends of the second rectilinear portions 221b in the second column.

Similarly, the second coil ends 221d extend outward at a predetermined inclination longitudinally outward relative to the first and second rectilinear portions 221a and 221b from second ends of the second rectilinear portions 221b in the second column toward first rectilinear portions 221a in the first column, are displaced by a distance 2×d in a direction of arrangement of the first and second rectilinear portions 221a and 221b by being bent approximately at right angles at central portions (second top portions 221f) between the columns of the first and second rectilinear portions 221a and 221b, and are subsequently bent approximately at right angles and extend longitudinally inward relative to the first and second rectilinear portions 221a and 221b toward the first rectilinear portions 221a in the first column at a predetermined inclination, and are connected to second ends of the first rectilinear portions 221a in the first column.

In first winding bodies 221 that are configured in this manner, the first and second rectilinear portions 221a and 221b are each arranged in the direction of the short sides of the oblong cross sections at a pitch of approximately (4×d) that is approximately four times the length of the short sides such that flat surfaces that are constituted by the long sides of the oblong cross sections face each other. The first rectilinear portions 221a and the second rectilinear portions 221b that are connected by the first coil ends 221c and the second coil ends 221d are offset in the direction of arrangement by a distance 2×d by the first top portions 221e and the second top portions 221f.

The first winding bodies 221 include: a winding end 221h that extends from a second end of the first rectilinear portion 221a that is positioned at a first end in a direction of arrangement of the first column in an identical direction to the second coil ends 221d approximately parallel to an inclined portion of the second coil ends 221d near the first rectilinear portion 221a to a center between the columns of first and second rectilinear portions 221a and 221b, and then extends outward in a longitudinal direction of the first and second rectilinear portions 221a and 221b; and a winding end 221g that extends from a second end of the second rectilinear portion 221b that is positioned at a second end in a direction of arrangement of the second column in an identical direction to the second coil ends 221d approximately parallel to an inclined portion of the second coil ends 221d near the second rectilinear portion 221b to a center between the columns of first and second rectilinear portions 221a and 221b, and then extends outward in a longitudinal direction of the first and second rectilinear portions 221a and 221b. Moreover, the portions of the winding ends 221g and 221h that extend parallel to the second coil ends 221d function as second coil ends.

As shown in FIGS. 12 through 14, the second winding bodies 222 include first and second rectilinear portions 222a and 222b, first and second coil ends 222c and 222d, and first and second top portions 222e and 222f, and are configured in a similar or identical manner to that of the first winding bodies 221.

The second winding bodies 222 include: a winding end 222h that extends from a second end of the first rectilinear portion 222a that is positioned at a first end in a direction of arrangement of the first column in an opposite direction to the second coil ends 222d approximately parallel to an inclined portion of the second coil ends 222d near a second rectilinear portion 222b to a length that is approximately equal to the inclined portion in question, and then extends outward in a longitudinal direction of the first and second rectilinear portions 222a and 222b; and a winding end 222g that extends from a second end of the second rectilinear portion 222b that is positioned at a second end in a direction of arrangement of the second column in an opposite direction to the second coil ends 222d approximately parallel to an inclined portion of the second coil ends 222d near the first rectilinear portion 222a to a length that is approximately equal to the inclined portion in question, and then extends outward in a longitudinal direction of the first and second rectilinear portions 222a and 222b.

Now, as shown in FIG. 15, the two-lane winding bodies 22 are produced by rotating and installing the second winding bodies 222 in the first winding bodies 221. Specifically, the second winding body 222 is rotated such that the second rectilinear portion 222b that is positioned at the second end of the second winding body 222 in the direction of arrangement of the second column is inserted between the two first rectilinear portions 221a near the first end of the first winding body 221 in the direction of arrangement of the first column from beside the first winding body 221. Then, orbiting portions that are constituted by the first and second rectilinear portions 222a and 222b and the first and second coil ends 222c and 222d that are positioned at the second end of the second winding body 222 in the direction of arrangement pass through a helical gap that is formed between orbiting portions that is constituted by the first and second rectilinear portions 221a and 221b and the first and second coil ends 221c and 221d of the first winding body 221 and advance in the direction of arrangement toward the second end. Thus, the helical orbiting portions that are constituted by the first and second rectilinear portions 222a and 222b and the first and second coil ends 222c and 222d of the second winding body 222 enter into the helical gap that is formed between the orbiting portions of the first winding body 221, and the second winding body 222 is installed inside the first winding body 221.

In the two-lane winding bodies 22 that are produced in this manner, as shown in FIGS. 6 through 8, the respective orbiting portions that are constituted by the first and second rectilinear portions 221a and 221b, the first and second coil ends 221c and 221d, and the first and second top portions 221e and 221f of the first winding body 221, and the respective orbiting portions that are constituted by the first and second rectilinear portions 222a and 222b, the first and second coil ends 222c and 222d, and the first and second top portions 222e and 222f of the second winding body 222, are stacked together in the direction of arrangement of the first and second rectilinear portions 221a, 221b, 222a, and 222b so as to contact each other or be in close proximity. In this case, the respective orbiting portions of the second winding body 222 are positioned on an inner circumferential side of the corresponding orbiting portions of the first winding body 221.

Figure 19:
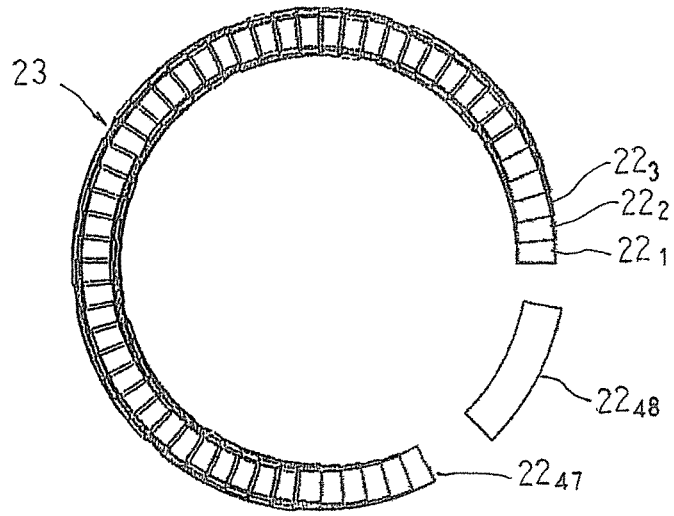
FIG. 19 is a diagram that explains the method for manufacturing the winding assembly according to Embodiment 1 of the present invention.
Figure 20:
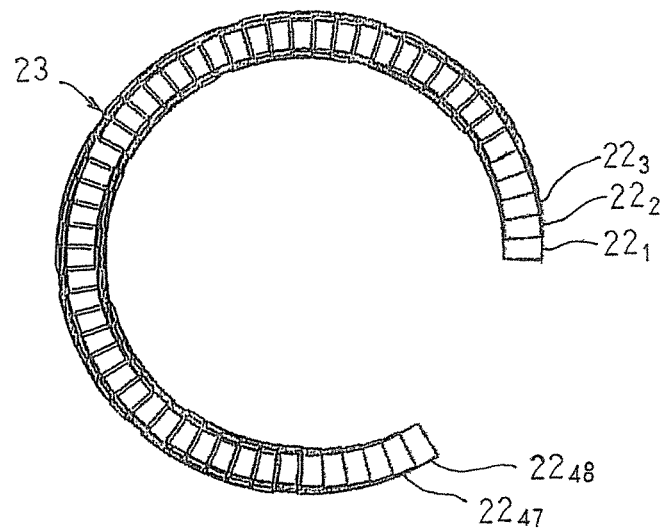
FIG. 20 is a diagram that explains the method for manufacturing the winding assembly according to Embodiment 1 of the present invention.
Figure 21:
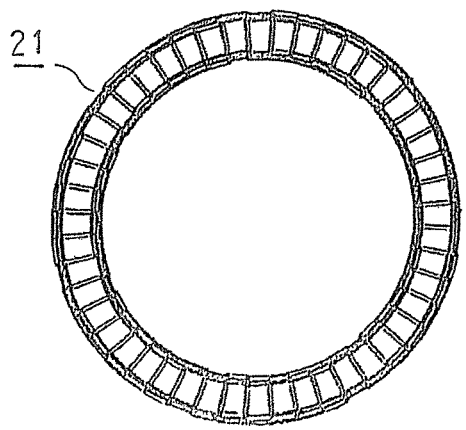
FIG. 21 is a diagram that explains the method for manufacturing the winding assembly according to Embodiment 1 of the present invention.
Figure 22:
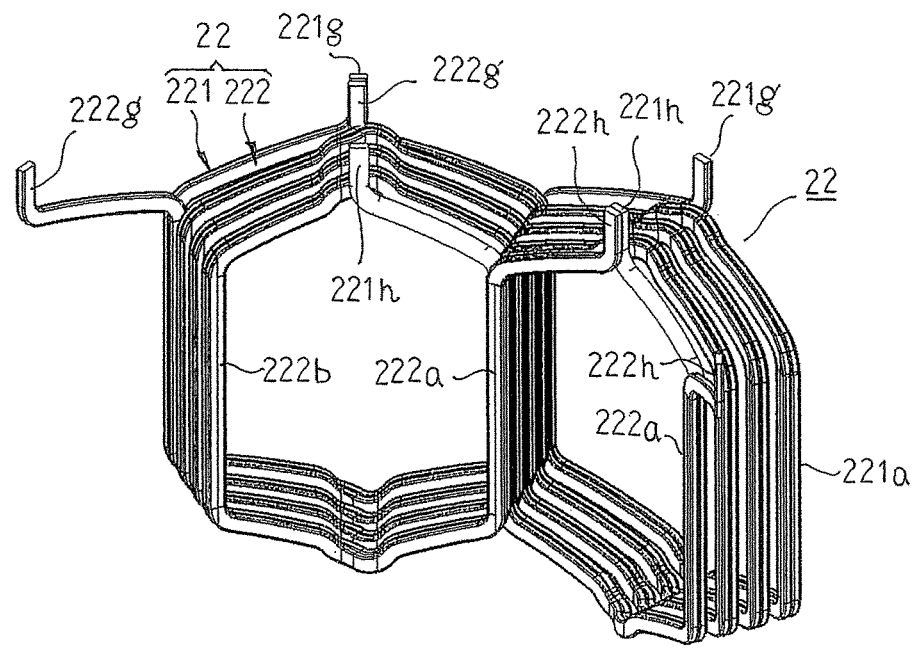
FIG. 22 is an oblique projection that shows an arranged state of two two-lane winding bodies that are separated by an angular pitch of six slots in the winding assembly according to Embodiment 1 of the present invention.
Figure 23:
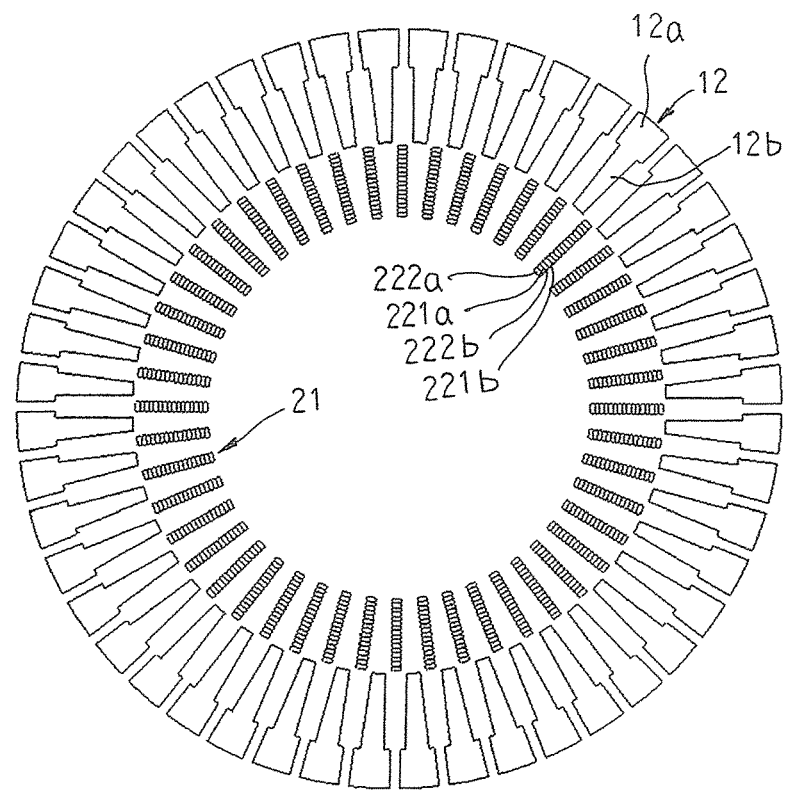
FIG. 23 is a diagram that explains a method for assembling the stator according to Embodiment 1 of the present invention.
Figure 24:
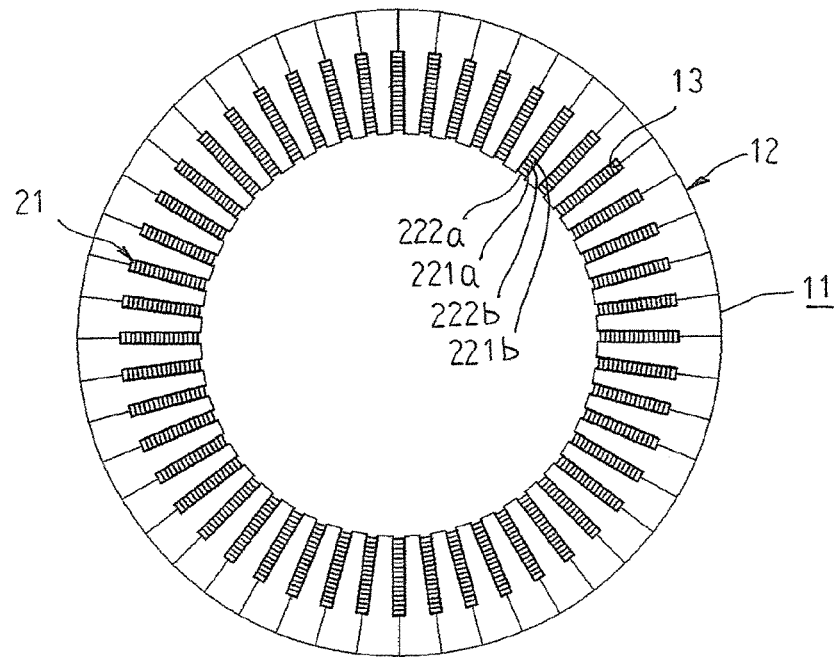
FIG. 24 is a diagram that explains the method for assembling the stator according to Embodiment 1 of the present invention.
Figure 25A:
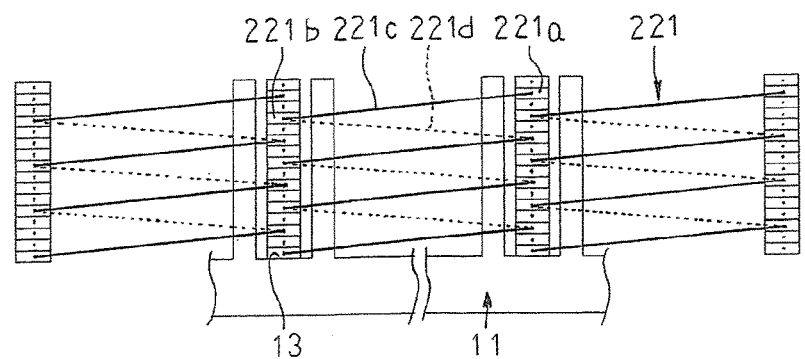
FIGS. 25A and 25B are developed projections of a state in which three two-lane winding bodies in the rotary electric machine according to Embodiment 1 of the present invention are mounted into identical slot groups of the stator core consecutively in a circumferential direction when viewed from a side near a first axial end.
Figure 25B:
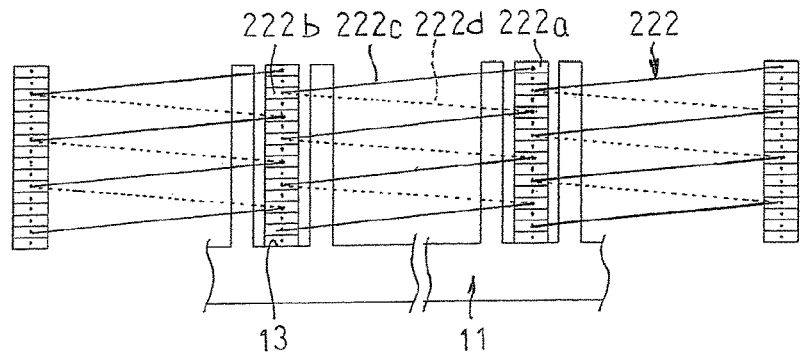

Next, a method for assembling the stator 10 will be explained. FIG. 18A through 21 are diagrams that explain a method for manufacturing the winding assembly according to Embodiment 1 of the present invention, FIGS. 18A through 18D showing a method for assembling two two-lane winding bodies 22, and FIGS. 19 through 21 showing a procedure for installing a forty-eighth two-lane winding body. Here, to facilitate explanation, the two-lane winding bodies 22 are designated two-lane winding body $22_1$, two-lane winding body $22_2$, two-lane winding body $22_3$; etc., through two-lane winding body $22_{47}$, and two-lane winding body $22_{48}$, in order of mounting. FIG. 22 is an oblique projection that shows an arranged state of two two-lane winding bodies that are separated by an angular pitch of six slots in the winding assembly according to Embodiment 1 of the present invention, and FIGS. 23 and 24 are diagrams that explain a method for assembling the stator according to Embodiment 1 of the present invention, FIG. 23 showing a state before mounting core blocks into the winding assembly, and FIG. 23 showing a state after mounting the core blocks into the winding assembly. Moreover, for simplicity, only the first and second rectilinear portions 221a, 222a, 221b, and 222b of the winding assembly 21 are shown in FIGS. 23 and 24. FIGS. 25A and 25B are developed projections of a state in which three two-lane winding bodies in the rotary electric machine according to Embodiment 1 of the present invention are mounted into identical slot groups of the stator core consecutively in a circumferential direction when viewed from a side near a first axial end, FIG. 25A showing arrangement of the first winding bodies, and FIG. 25B showing arrangement of the second winding bodies.

Figure 18A:
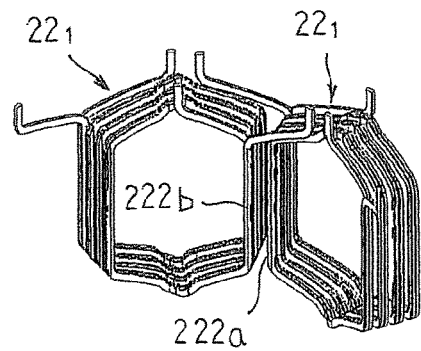
FIGS. 18A through 18D are diagrams that explain a method for manufacturing the winding assembly according to Embodiment 1 of the present invention.
Figure 18B:
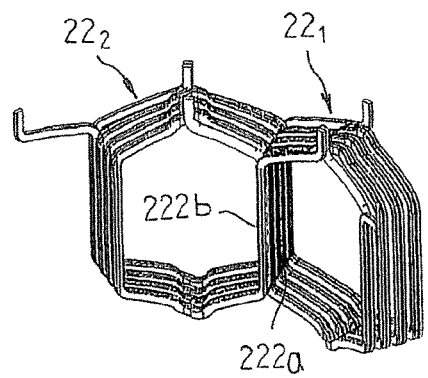
Figure 18C:
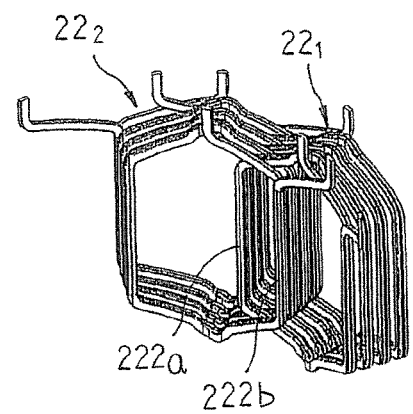
Figure 18D:
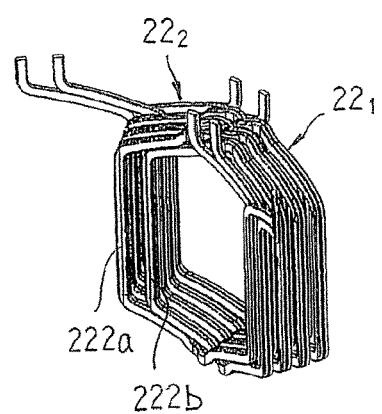

As shown in FIG. 18A, the first and second two-lane winding bodies $22_1$ and $22_2$ are first placed circumferentially adjacent to each other so as to align axial height positions. Next, as shown in FIG. 18B, the first rectilinear portions 221a and 222a of the first winding body $22_1$ are inserted between the second rectilinear portions 221b and 222b of the second winding body $22_2$. Next, as shown in FIG. 18C, the second two-lane winding body 222 is moved in a circumferential direction. Then, as shown in FIG. 18D, the second two-lane winding body $22_2$ is moved circumferentially until the first rectilinear portions 221a and 222a of the second two-lane winding body $22_2$ are at a position that is separated by a pitch of one slot (the angle between two slots) from the first rectilinear portions 221a and 222a of the first winding body $22_1$. The two two-lane winding bodies $22_1$ and $22_2$ are assembled thereby.

Two-lane winding bodies 22 are similarly mounted sequentially by aligning axial height positions and moving them circumferentially until the forty-seventh two-lane winding body $22_{47}$. As shown in FIG. 19, a diameter of the assemblage 23 in which the forty-seven two-lane winding bodies $22_1$ through $22_{47}$ are assembled is increased to form a C shape that is wider than a circumferential width of the forty-eighth two-lane winding body $22_{48}$ between the first two-lane winding body $22_1$ and the forty-seventh two-lane winding body $22_{47}$.

Next, as shown in FIG. 20, the forty-eighth two-lane winding body $22_{48}$ is mounted onto an end near the forty-seventh two-lane winding body $22_{47}$ of the assemblage 23. In addition, as shown in FIG. 21, an opening of the C-shaped assemblage 23 is closed such that the first two-lane winding body $22_1$ and the forty-eighth two-lane winding body $22_{48}$ are fitted together, to assemble the annular winding assembly 21 that is shown in FIG. 5.

In this winding assembly 21, as shown in FIG. 22, sixteen first and second rectilinear portions 221a, 222a, 221b, and 222b of two two-lane winding bodies 22 that are separated by an angular pitch of six slots are arranged in a single column radially such that a first rectilinear portion 222a, a first rectilinear portion 221a, a second rectilinear portion 222b, and a second rectilinear portion 221b are repeated sequentially four times from a radially inner side. A winding end 222h of a first two-lane winding body 22 extends so as to be approximately parallel to and face a second coil end 222d that is positioned radially inside a second two-lane winding body 22, and an end portion thereof is in close proximity to an end portion of a winding end 221h of the second two-lane winding body 22 in a radial direction. A winding end 222g of the second two-lane winding body 22 extends so as to be approximately parallel to a second coil end 221d that is positioned radially outside the first two-lane winding body 22, and an end portion thereof is in close proximity to an end portion of a winding end 221g of the first two-lane winding body 22 in a radial direction.

Next, forty-eight core blocks 12 are arranged at an approximately uniform angular pitch circumferentially such that respective teeth are positioned on a radially outer side between adjacent columns of first and second rectilinear portions 221a, 222a, 221b, and 222b of the winding assembly 21, as shown in FIG. 23. Next, the core blocks 12 that are arranged circumferentially are simultaneously moved radially inward. The respective teeth 12b of the core blocks 12 are thereby inserted between the adjacent columns of first and second rectilinear portions 221a, 222a, 221b, and 222b. When the core blocks 12 are moved radially further inward, circumferential side surfaces of the adjacent core blocks 12 are butted against each other, preventing radially inward movement of the core blocks 12. The forty-eight core blocks 12 are thereby mounted into the winding assembly 21, as shown in FIG. 24.

The winding assembly 21 is thereby mounted into the stator core 11, which is constituted by the forty-eight core blocks 12. Here, in a step of inserting the teeth 12b of the core blocks 12 between the first and second rectilinear portions 221a, 222a, 221b, and 222b from an outer radial side of the winding assembly 21, because tapered teeth 12b are inserted between each of the columns of first and second rectilinear portions 221a, 222a, 221b, and 222b from radially outside and moved radially inward, the sixteen first and second rectilinear portions 221a, 222a, 221b, and 222b are arranged neatly into single columns. As shown in FIGS. 25A and 25B, inside each of the slots 13, sixteen first and second rectilinear portions 221*a*, 222*a*, 221*b*, and 222*b* are housed such that the long sides of the oblong cross sections are oriented circumferentially so as to line up neatly in a single column in a radial direction.

Figure 26:
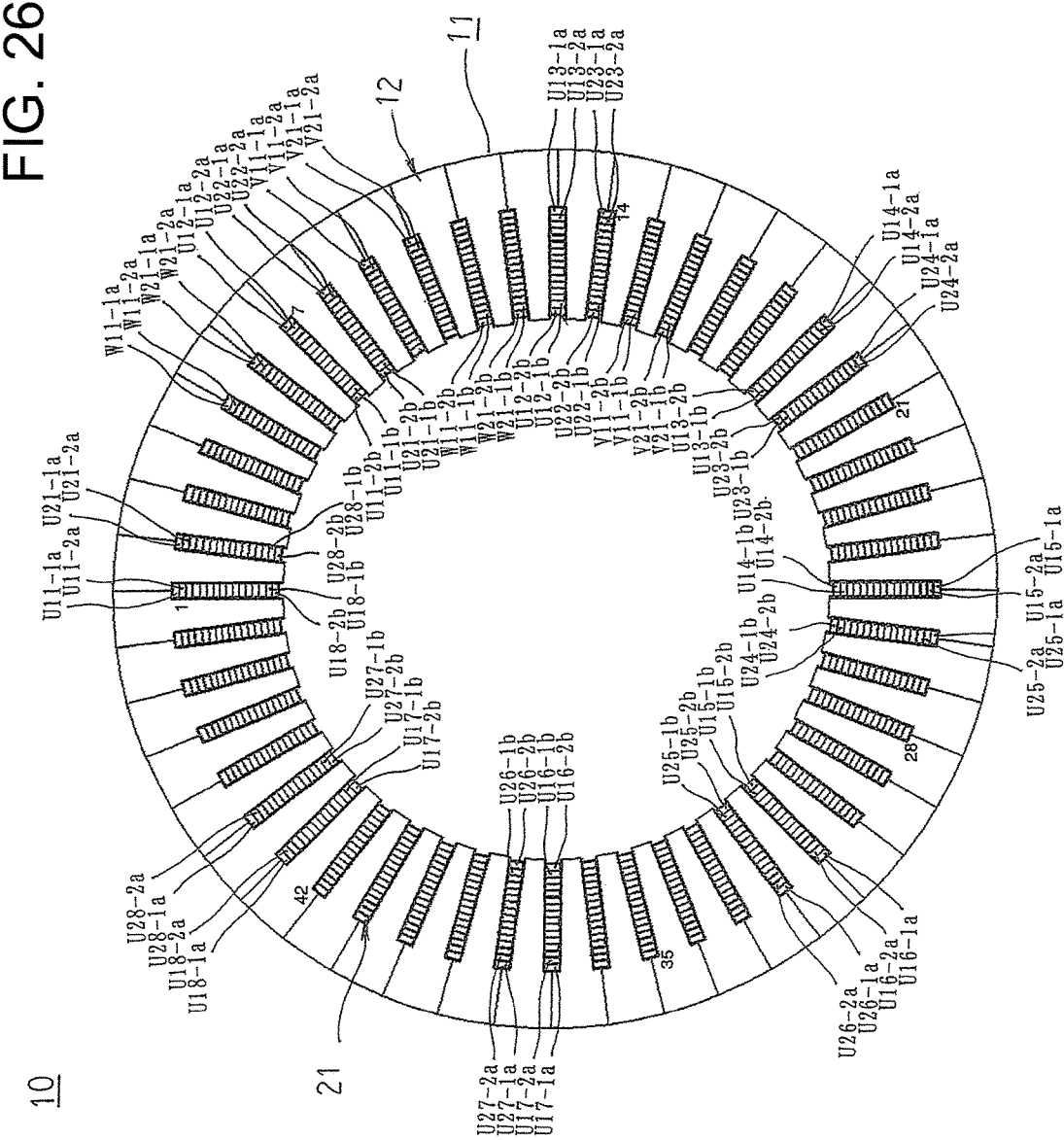
FIG. 26 is an end elevation that shows terminal positions of the stator winding in the rotary electric machine according to Embodiment 1 of the present invention.
Figure 28:
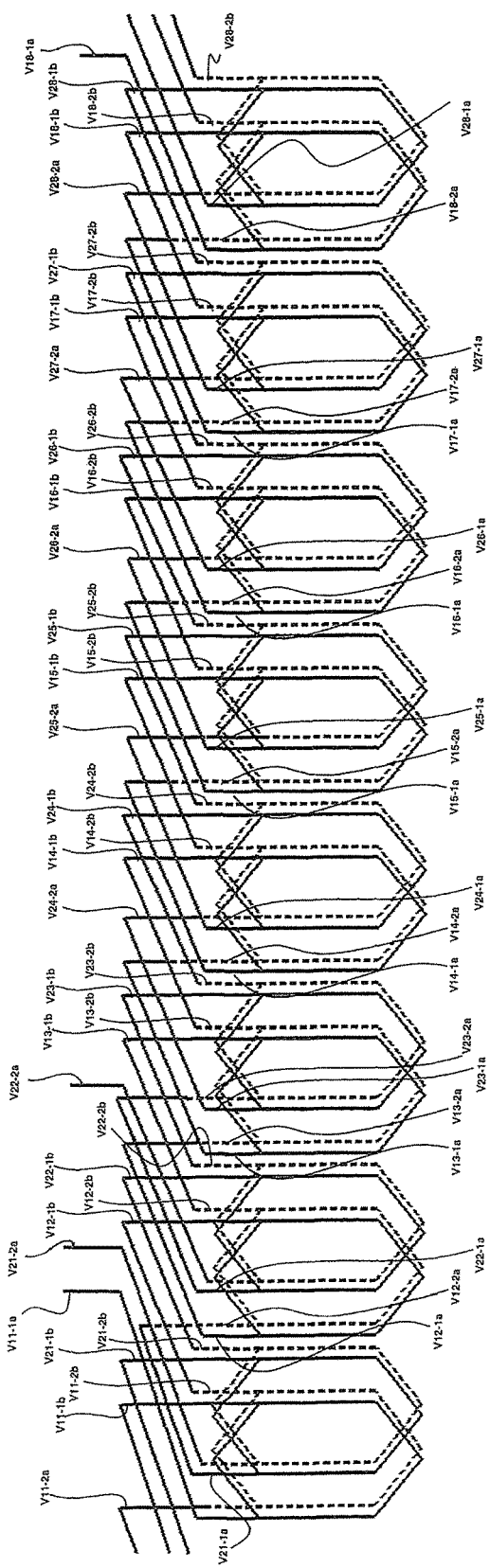
FIG. 28 is a schematic diagram that explains a method for connecting a V-phase winding of the stator winding in the rotary electric machine according to Embodiment 1 of the present invention.
Figure 29:
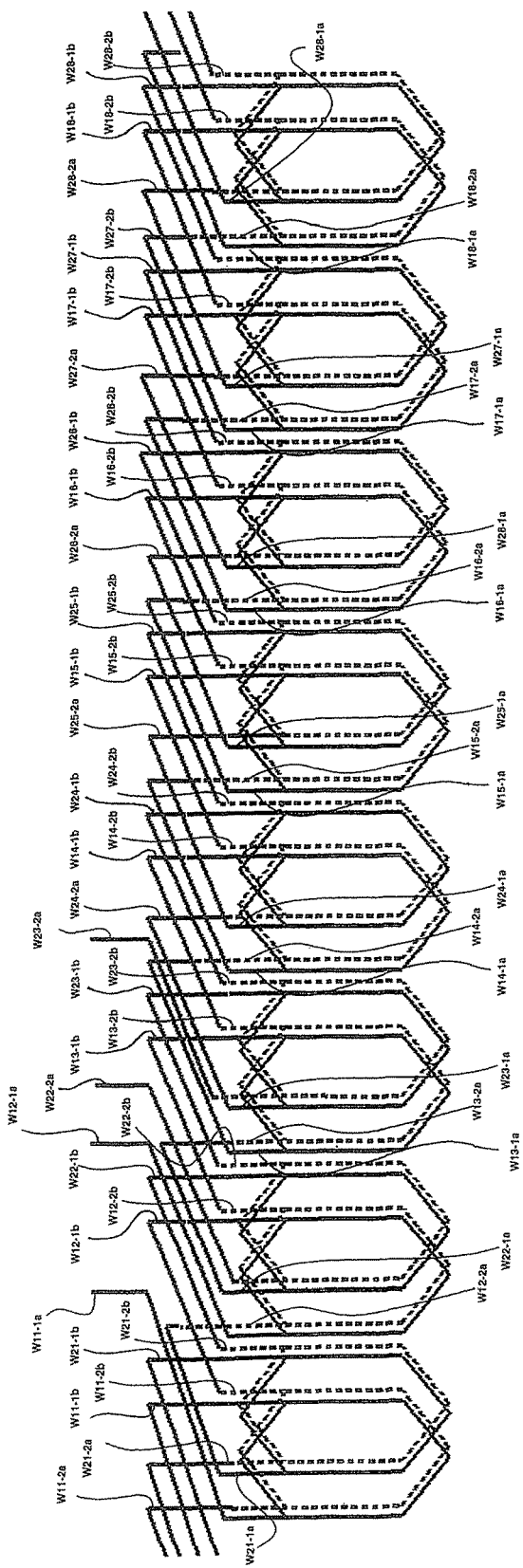
FIG. 29 is a schematic diagram that explains a method for connecting a W-phase winding of the stator winding in the rotary electric machine according to Embodiment 1 of the present invention.
Figure 30:
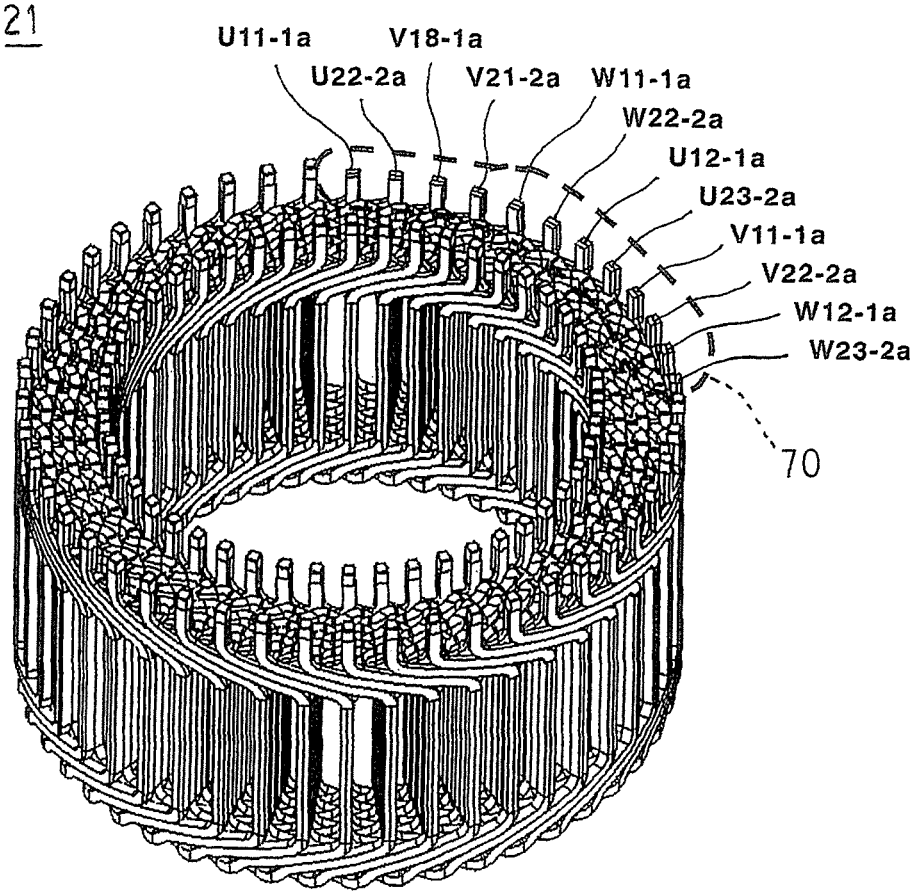
FIG. 30 is an oblique projection that shows a state in which the winding assembly in the rotary electric machine according to Embodiment 1 of the present invention is welded except for electric power supplying portions.

Next, a method for connecting the winding assembly 21 will be explained with reference to FIGS. 26 through 30. FIG. 26 is an end elevation that shows terminal positions of the stator winding in the rotary electric machine according to Embodiment 1 of the present invention, FIG. 27 is a schematic diagram that explains a method for connecting a U-phase winding of the stator winding in the rotary electric machine according to Embodiment 1 of the present invention, FIG. 28 is a schematic diagram that explains a method for connecting a V-phase winding of the stator winding in the rotary electric machine according to Embodiment 1 of the present invention, FIG. 29 is a schematic diagram that explains a method for connecting a W-phase winding of the stator winding in the rotary electric machine according to Embodiment 1 of the present invention, and FIG. 30 is an oblique projection that shows a state in which the winding assembly in the rotary electric machine according to Embodiment 1 of the present invention is welded except for electric power supplying portions.

Terminal positions of the two-lane winding bodies 22 that are mounted into the stator core 11 are shown in FIG. 26. In FIG. 26, 1, 4, 7, etc., through 42 are slot numbers that have been allotted to the slots 13 sequentially in a circumferential direction. U11-1*a*, U11-2*a*, etc., through U18-2*a* and U11-1*b*, U11-2*b*, etc., through U18-2*b* are winding ends of two-lane winding bodies 22 that constitute a U-phase winding in which first and second rectilinear portions 221*a*, 222*a*, 221*b*, and 222*b* are mounted into a group of slots 13 at Slot Numbers (1+6n), where n is a natural number that includes 0, and U21-1*a*, U21-2*a*, etc., through U28-2*a* and U21-1*b*, U21-2*b*, etc., through U28-2*b* are winding ends of two-lane winding bodies 22 that constitute a U-phase winding in which first and second rectilinear portions 221*a*, 222*a*, 221*b*, and 222*b* are mounted into a group of slots 13 at Slot Numbers (2+6n), where n is a natural number that includes 0.

Two-lane winding bodies 22 that are mounted into a group of slots 13 at Slot Numbers (9+6n) and a group of slots 13 at Slot Numbers (10+6n) constitute a V-phase winding. Two-lane winding bodies 22 that are mounted into a group of slots 13 at Slot Numbers (5+6n) and a group of slots 13 at Slot Numbers (6+6n) constitute a W-phase winding. In this case, to facilitate explanation only V11-1*a*, V11-2*a*, V11-1*b*, V11-2*b*, V21-1*a*, V21-2*a*, V21-1*b*, and V21-2*b* are shown as winding ends of the two-lane winding bodies 22 that constitute the V-phase winding, and only W11-1*a*, W11-2*a*, W11-1*b*, W11-2*b*, W21-1*a*, W21-2*a*, W21-1*b*, and W21-2*b* are shown as winding ends of the two-lane winding bodies 22 that constitute the W-phase winding.

Figure 27:
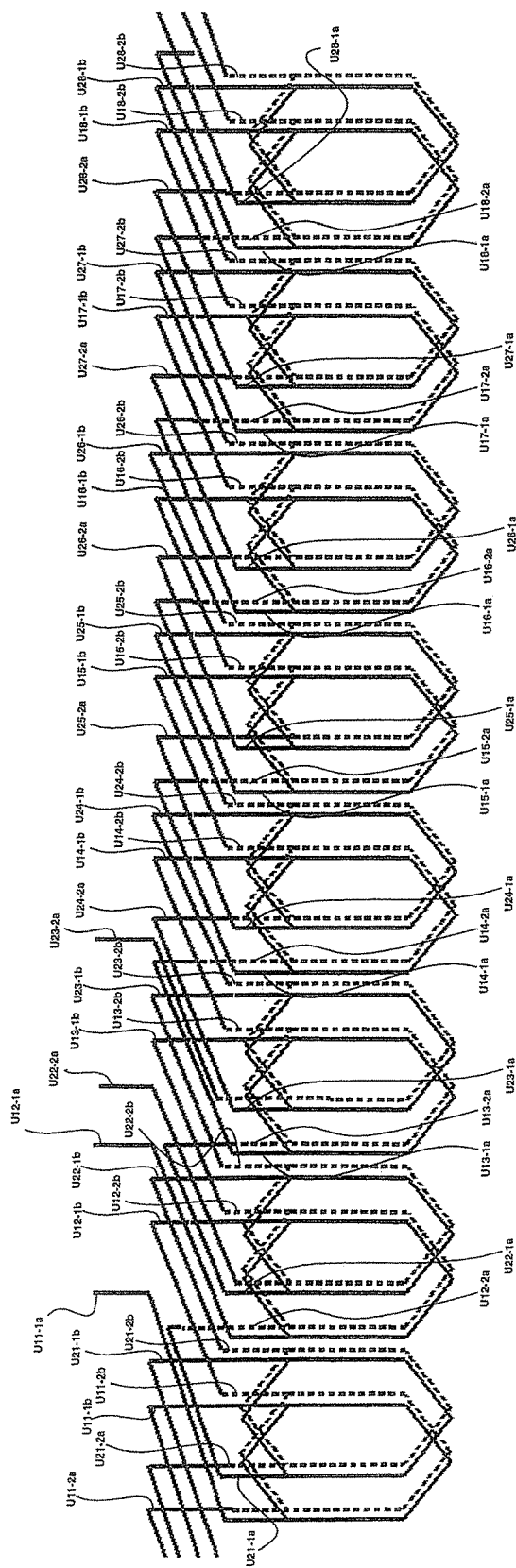
FIG. 27 is a schematic diagram that explains a method for connecting a U-phase winding of the stator winding in the rotary electric machine according to Embodiment 1 of the present invention.

To produce the U-phase winding, first U11-1*b* and U18-2*b*, U18-2*a* and U17-1*a*, U17-1*b* and U16-2*b*, U16-2*a* and U15-1*a*, U15-1*b* and U14-2*b*, U14-2*a* and U13-1*a*, U13-1*b* and U12-2*b*, U12-2*a* and U21-1*a*, U21-1*b* and U28-2*b*, U28-2*a* and U27-1*a*, U27-1*b* and U26-2*b*, U26-2*a* and U25-1*a*, U25-1*b* and U24-2*b*, U24-2*a* and U23-1*a*, and U23-1*b* and U22-2*b* are connected, as shown in FIG. 27. A U-phase first winding in which sixteen first and second winding bodies 221 and 222 are connected in series is obtained thereby. U11-1*a* and U22-2*a* constitute an electric power supply end and a neutral point of the U-phase first winding.

U23-2*b* and U24-1*b*, U24-1*a* and U25-2*a*, U25-2*b* and U26-1*b*, U26-1*a* and U27-2*a*, U27-2*b* and U28-1*b*, U28-1*a* and U21-2*a*, U21-2*b* and U22-1*b*, U22-1*a* and U13-2*a*, U13-2*b* and U14-1*b*, U14-1*a* and U15-2*a*, U15-2*b* and U16-1*b*, U16-1*a* and U17-2*a*, U17-2*b* and U18-1*b*, U18-1*a* and U11-2*a*, and U11-2*b* and U12-1*b* are similarly connected. A U-phase second winding in which sixteen first and second winding bodies 221 and 222 are connected in series is obtained thereby. U23-2*a* and U12-1*a* constitute an electric power supply end and a neutral point of the U-phase second winding.

Next, U22-2*a* and U12-1*a* are connected to obtain a U-phase winding in which U-phase first and second windings in which sixteen first and second winding bodies 221 and 222 are connected in series are connected in parallel. Moreover, U11-1*a* and U22-2*a* constitute electric power supply ends of the U-phase winding.

To produce the V-phase winding, first V11-1*b* and V18-2*b*, V18-2*a* and V17-1*a*, V17-1*b* and V16-2*b*, V16-2*a* and V15-1*a*, V15-1*b* and V14-2*b*, V14-2*a* and V13-1*a*, V13-1*b* and V12-2*b*, V12-2*a* and V21-1*a*, V21-1*b* and V28-2*b*, V28-2*a* and V27-1*a*, V27-1*b* and V26-2*b*, V26-2*a* and V25-1*a*, V25-1*b* and V24-2*b*, V24-2*a* and V23-1*a*, and V23-1*b* and V22-2*b* are connected, as shown in FIG. 28. A V-phase first winding in which sixteen first and second winding bodies 221 and 222 are connected in series is obtained thereby. V11-1*a* and V22-2*a* constitute an electric power supply end and a neutral point of the V-phase first winding.

V21-2*b* and V22-1*b*, V22-1*a* and V23-2*a*, V23-2*b* and V24-1*b*, V24-1*a* and V25-2*a*, V25-2*b* and V26-1*b*, V26-1*a* and V27-2*a*, V27-2*b* and V28-1*b*, V28-1*a* and V11-2*a*, V11-2*b* and V12-1*b*, V12-1*a* and V13-2*a*, V13-2*b* and V14-1*b*, V14-1*a* and V15-2*a*, V15-2*b* and V16-1*b*, V16-1*a* and V17-2*a*, and V17-2*b* and V18-1*b* are similarly connected. A V-phase second winding in which sixteen first and second winding bodies 221 and 222 are connected in series is obtained thereby. V21-2*a* and V18-1*a* constitute an electric power supply end and a neutral point of the V-phase second winding.

Next, V22-2*a* and V18-1*a* are connected to obtain a V-phase winding in which V-phase first and second windings in which sixteen first and second winding bodies 221 and 222 are connected in series are connected in parallel. Moreover, V11-1*a* and V21-2*a* constitute electric power supply ends of the V-phase winding.

To produce the W-phase winding, first W11-1*b* and W18-2*b*, W18-2*a* and W17-1*a*, W17-1*b* and W16-2*b*, W16-2*a* and W15-1*a*, W15-1*b* and W14-2*b*, W14-2*a* and W13-1*a*, W13-1*b* and W12-2*b*, W12-2*a* and W21-1*a*, W21-1*b* and W28-2*b*, W28-2*a* and W27-1*a*, W27-1*b* and W26-2*b*, W26-2*a* and W25-1*a*, W25-1*b* and W24-2*b*, W24-2*a* and W23-1*a*, and W23-1*b* and W22-2*b* are connected, as shown in FIG. 29. A W-phase first winding in which sixteen first and second winding bodies 221 and 222 are connected in series is obtained thereby. W11-1*a* and W22-2*a* constitute an electric power supply end and a neutral point of the W-phase first winding.

W23-2*b* and W24-1*b*, W24-1*a* and W25-2*a*, W25-2*b* and W26-1*b*, W26-1*a* and W27-2*a*, W27-2*b* and W28-1*b*, W28-1*a* and W21-2*a*, W21-2*b* and W22-1*b*, W22-1*a* and W13-2*a*, W13-2*b* and W14-1*b*, W14-1*a* and W15-2*a*, W15-2*b* and W16-1*b*, W16-1*a* and W17-2*a*, W17-2*b* and W18-1*b*, W18-1*a* and W11-2*a*, and W11-2*b* and W12-1*b* are similarly connected. A W-phase second winding in which sixteen first and second winding bodies 221 and 222 are connected in series is obtained thereby. W23-2a and W12-1a constitute an electric power supply end and a neutral point of the W-phase second winding.

Next, W22-2a and W12-1a are connected to obtain a W-phase winding in which W-phase first and second windings in which sixteen first and second winding bodies 221 and 222 are connected in series are connected in parallel. Moreover, W11-1a and V23-2a constitute electric power supply ends of the W-phase winding.

In the winding assembly 21 that is connected in this manner, as shown in FIG. 30, the connected portions among the winding ends are arranged circumferentially around the radially inner side and the radially outer side of the winding assembly 21 at a pitch of one slot. A winding end group 70 that is constituted by the electric power supply ends U11-1a, U23-2a, V11-1a, V21-2a, W11-1a, W23-2a and the neutral points U12-1a, U22-2a, V18-1a, V22-2a, W12-1a, W22-2a is also arranged at a pitch of one slot circumferentially around the radially outer side of the winding assembly 21.

According to Embodiment 1, the first and second winding bodies 221 and 222 are configured so as to have helical shapes by winding a conductor wire for four turns. Then, the first and second winding bodies 221 and 222 are assembled such that the respective orbiting portions of the first winding bodies 221 and the respective orbiting portions of the second winding bodies 222 are stacked together in the direction of arrangement of the first and second rectilinear portions 221a, 221b, 222a, and 222b so as to contact each other or be in close proximity, to assemble the two-lane winding bodies 22.

Because the first and second winding bodies 221 and 222 are configured such that the first and second coil ends 221c, 222c, 221d, and 222d are displaced by the first and second top portions 221e, 222e, 221f, and 222f by a radial dimension (2×d) of two conductor wires that are stacked in a direction of arrangement (radially), the two-lane winding bodies 22 can be arranged circumferentially at a pitch of one slot without interference, improving assembly of the winding assembly 21.

The amount of radial displacement (2×d) at the first and second top portions 221e, 222e, 221f, and 222f of the first and second winding bodies 221 and 222 is less than a total sum (8×d) of the radial dimensions of the first and second rectilinear portions 221a, 222a, 221b, and 222b that constitute one two-lane winding body 22 that is housed inside the slots 13. Thus, radial and axial dimensions of the coil end groups can be reduced, enabling the rotary electric machine 100 to be reduced in size.

In Patent Literature 1, for example, because vertex portions that are positioned at two axial ends of the hexagonal coils are formed into crank shapes that are shifted by only a width dimension in the direction of alignment of the conductor wires that constitute the hexagonal coils, if the number of turns in those hexagonal coils is made equal to that of the two-lane winding bodies 22, then the amount of radial displacement at the vertex portions is 8×d. Consequently, in Patent Literature 1, it can be seen that the radial and axial dimensions of the coil end groups are greater, leading to increases in the size of the rotary electric machine.

Because the winding end group 70 that is constituted by the electric power supply ends and the neutral points is gathered together radially outside the winding assemblies 21, configuration of the electric power supplying portions is simplified in rotary electric machines that have dimensional constraints on a radially inner side.

The winding ends 221g and 221h of the first winding bodies 221 each emerge from the slots 13 at the first axial end, and then extend circumferentially inward relative to the first winding bodies 221. The winding ends 222g of the second winding bodies 222, 222h are each configured so as to emerge from the slots 13 at the first axial end, and then extend circumferentially outward relative to the second winding bodies 222. In addition, the end portions of the winding ends 222g and 222h of the second winding bodies 222 of the two-lane winding bodies 22 are configured so as to overlap radially with the end portions of the winding ends 221g and 221h of the first winding bodies 221 of other two-lane winding bodies 22 that are positioned in the direction of extension of the winding ends 222g and 222h. Consequently, when the two-lane winding bodies 22 are arranged at a pitch of one slot in a circumferential direction, because the winding ends 221g, 222g, 221h, and 222h of the first and second winding bodies 221 and 222 are stacked together in a radial direction without interfering with each other, as shown in FIG. 22, joining among the winding ends of the winding assembly 21 is facilitated, and reductions in the size of the joint portions are also enabled.

Now, in Patent Literature 1, because crossover wires are disposed so as to extend axially outside the coil end groups from the outer circumferential side to the inner circumferential side, axial dimensions of the rotary electric machine are increased. In Embodiment 1, because the connections among the first and second winding bodies 221 and 222 are completed on the radially inner side and the radially outer side of the winding assembly 21, crossover wires that extend in the radial direction to connect together the winding ends of the first and second winding bodies 221 and 222 are no longer necessary, making the coil end groups more compact, and enabling the rotary electric machine to be reduced in size.

Moreover, in Embodiment 1 above, the winding end group 70 that is constituted by the electric power supply ends and the neutral points is gathered together radially outside the winding assemblies 21, but the method for connecting the first and second winding bodies 221 and 222 may be changed, and the winding end group 70 that is constituted by the electric power supply ends and the neutral points gathered together radially inside the winding assemblies 21. In that case, configuration of the electric power supplying portions is simplified in rotary electric machines that have dimensional constraints on a radially outer side.

Embodiment 2

Figure 31:
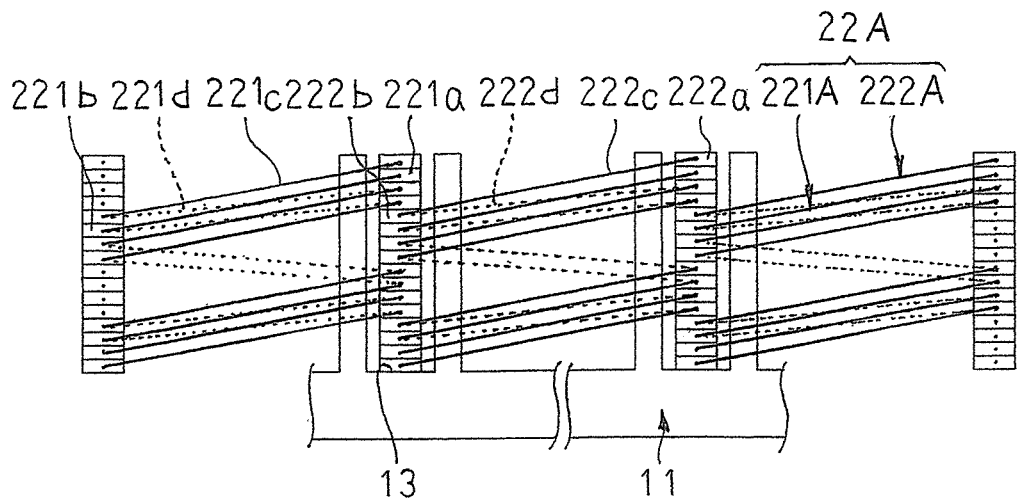
FIG. 31 is a developed projection of a state in which three two-lane winding bodies in a rotary electric machine according to Embodiment 2 of the present invention are mounted into identical slot groups of a stator core consecutively in a circumferential direction when viewed from a side near a first axial end.

FIG. 31 is a developed projection of a state in which three two-lane winding bodies in a rotary electric machine according to Embodiment 2 of the present invention are mounted into identical slot groups of a stator core consecutively in a circumferential direction when viewed from a side near a first axial end. Moreover, for simplicity, coil ends are represented by straight lines in FIG. 31, first coil ends being represented by solid lines, and second coil ends being represented by broken lines. Furthermore, radial positions of first and second rectilinear portions that are housed in slots in single columns will be designated a first layer, a second layer, a third layer, etc., through a sixteenth layer.

In FIG. 31, two-lane winding bodies 22A include first winding bodies 221A and second winding bodies 222A that are each produced by winding a conductor wire that has an oblong cross section for four turns helically to produce a tubular coil body, and subsequently forming the coil body into an approximate hexagon shape using a coil forming machine, for example.

First winding bodies 221A include: four first rectilinear portions 221a that are housed in a second layer, a fourth layer, a tenth layer, and a twelfth layer of a slot 13 on a first side of six consecutive teeth 12b; four second rectilinear portions 221b that are housed in a sixth layer, an eighth layer, a fourteenth layer, and a sixteenth layer of a slot 13 on a second side of the six consecutive teeth 12b; and first and second coil ends 221c and 221d that alternately link first longitudinal ends to each other and second longitudinal ends to each other between columns of the first and second rectilinear portions 221a and 221b. Moreover, the first and second rectilinear portions 221a and 221b are housed in the slots 13 such that long sides of the oblong cross sections are oriented in a circumferential direction.

Also included are: a winding end 221h (not shown) that extends from a second end of the first rectilinear portion 221a that is positioned in the second layer of the slot 13 on the first side in an identical direction to the second coil ends 221d approximately parallel to an inclined portion of the second coil ends 221d near the first rectilinear portion 221a to a center between the columns of first and second rectilinear portions 221a and 221b, and then extends outward in a longitudinal direction of the first and second rectilinear portions 221a and 221b; and a winding end 221g (not shown) that extends from a second end of the second rectilinear portion 221b that is positioned in the sixteenth layer of the slot 13 on the second side in an identical direction to the second coil ends 221d approximately parallel to an inclined portion of the second coil ends 221d near the second rectilinear portion 221b to a center between the columns of first and second rectilinear portions 221a and 221b, and then extends outward in a longitudinal direction of the first and second rectilinear portions 221a and 221b.

The four first coil ends 221c are each displaced radially outward by a distance 4×d at first top portions 221e (not shown). One second coil end 221d is displaced radially inward by a distance 2×d at a second top portion 221f (not shown), and two second coil ends 221d are displaced radially outward by a distance 2×d at second top portions 221f (not shown).

Second winding bodies 222A include: four first rectilinear portions 222a that are housed in a first layer, a third layer, a ninth layer, and an eleventh layer of a slot 13 on a first side of six consecutive teeth 12b; four second rectilinear portions 222b that are housed in a fifth layer, a seventh layer, a thirteenth layer, and a fifteenth layer of a slot 13 on a second side of the six consecutive teeth 12b; and first and second coil ends 222c and 222d that alternately link first longitudinal ends to each other and second longitudinal ends to each other between columns of the first and second rectilinear portions 222a and 222b. Moreover, the first and second rectilinear portions 222a and 222b are housed in the slots 13 such that long sides of the oblong cross sections are oriented in a circumferential direction.

Also included are: a winding end 222h (not shown) that extends from a second end of the first rectilinear portion 222a that is positioned in the first layer of the slot 13 on the first side in an opposite direction to the second coil ends 222d approximately parallel to an inclined portion of the second coil ends 222d near the second rectilinear portion 222b to a length that is approximately equal to the inclined portion in question, and then extends outward in a longitudinal direction of the first and second rectilinear portions 222a and 222b; and a winding end 222g (not shown) that extends from a second end of the second rectilinear portion 222b that is positioned in the fifteenth layer of the slot 13 on the second side in an opposite direction to the second coil ends 222d approximately parallel to an inclined portion of the second coil ends 222d near the second rectilinear portion 222b to a length that is approximately equal to the inclined portion in question, and then extends outward in a longitudinal direction of the first and second rectilinear portions 222a and 222b.

The four first coil ends 222c are each displaced radially outward by a distance 4×d at first top portions 222e (not shown). One second coil end 222d is displaced radially inward by a distance 2×d at a second top portion 222f (not shown), and two second coil ends 222d are displaced radially outward by a distance 2×d at second top portions 222f (not shown).

The first winding bodies 221A and the second winding bodies 222A that are produced in this manner are assembled into two-lane winding bodies 22A by mounting the second winding bodies 222A to the first winding bodies 221A while rotating them in a similar or identical manner to Embodiment 1. In the two-lane winding bodies 22A that are assembled in this manner, the respective orbiting portions that are constituted by the first and second rectilinear portions 221a and 221b, the first and second coil ends 221c and 221d, and the first and second top portions 221e and 221f of the first winding body 221A, and the respective orbiting portions that are constituted by the first and second rectilinear portions 222a and 222b, the first and second coil ends 222c and 222d, and the first and second top portions 222e and 222f of the second winding body 222A, are stacked together in the direction of arrangement of the first and second rectilinear portions 221a, 221b, 222a, and 222b (radially) so as to contact each other or be in close proximity.

In Embodiment 2, the first and second winding bodies 221A and 222A are configured so as to have helical shapes by winding a conductor wire for four turns. Then, the first and second winding bodies 221A and 222A are assembled such that the respective orbiting portions of the first winding bodies 221A and the respective orbiting portions of the second winding bodies 222A are stacked together in the direction of arrangement of the first and second rectilinear portions 221a, 221b, 222a, and 222b so as to contact each other or be in close proximity, to assemble the two-lane winding bodies 22A.

Because the first and second winding bodies 221A and 222A are configured such that the first and second coil ends 221c, 222c, 221d, and 222d are displaced by the first and second top portions 221e, 222e, 221f, and 222f by 4×d or 2×d radially, the two-lane winding bodies 22A can be arranged circumferentially at a pitch of one slot without interference, improving assembly of the winding assembly.

The amount of radial displacement at the first and second top portions 221e, 222e, 221f, and 222f of the first and second winding bodies 221A and 222A is less than a total sum (8×d) of the radial dimensions of the first and second rectilinear portions 221a, 222a, 221b, and 222b that constitute one two-lane winding body 22A that is housed inside the slots 13. Thus, radial and axial dimensions of the coil end groups can be reduced, enabling the rotary electric machine to be reduced in size.

Embodiment 3

Figure 32:
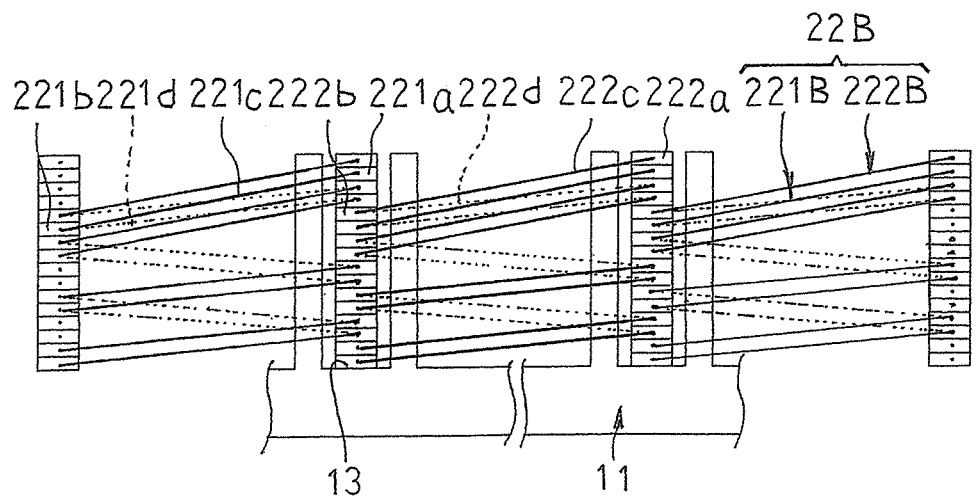
FIG. 32 is a developed projection of a state in which three two-lane winding bodies in a rotary electric machine according to Embodiment 3 of the present invention are mounted into identical slot groups of a stator core consecutively in a circumferential direction when viewed from a side near a first axial end.

FIG. 32 is a developed projection of a state in which three winding bodies in a rotary electric machine according to Embodiment 3 of the present invention are mounted into identical slot groups of a stator core consecutively in a circumferential direction when viewed from a side near a first axial end. Moreover, for simplicity, coil ends are represented by straight lines in FIG. 32, first coil ends being represented by solid lines, and second coil ends being represented by broken lines. Furthermore, radial positions of first and second rectilinear portions that are housed in slots in single columns will be designated a first layer, a second layer, a third layer, etc., through a sixteenth layer.

In FIG. 32, two-lane winding bodies 22B include first winding bodies 221B and second winding bodies 222B that are each produced by winding a conductor wire that has an oblong cross section for four turns helically to produce a tubular coil body, and subsequently forming the coil body into an approximate hexagon shape using a coil forming machine, for example.

First winding bodies 221B include: four first rectilinear portions 221a that are housed in a second layer, a fourth layer, a tenth layer, and a fourteenth layer of a slot 13 on a first side of six consecutive teeth 12b; four second rectilinear portions 221b that are housed in a sixth layer, an eighth layer, a twelfth layer, and a sixteenth layer of a slot 13 on a second side of the six consecutive teeth 12b; and first and second coil ends 221c and 221d that alternately link first longitudinal ends to each other and second longitudinal ends to each other between columns of the first and second rectilinear portions 221a and 221b. Moreover, the first and second rectilinear portions 221a and 221b are housed in the slots 13 such that long sides of the oblong cross sections are oriented in a circumferential direction.

Also included are: a winding end 221h (not shown) that extends from a second end of the first rectilinear portion 221a that is positioned in the second layer of the slot 13 on the first side in an identical direction to the second coil ends 221d approximately parallel to an inclined portion of the second coil ends 221d near the first rectilinear portion 221a to a center between the columns of first and second rectilinear portions 221a and 221b, and then extends outward in a longitudinal direction of the first and second rectilinear portions 221a and 221b; and a winding end 221g (not shown) that extends from a second end of the second rectilinear portion 221b that is positioned in the sixteenth layer of the slot 13 on the second side in an identical direction to the second coil ends 221d approximately parallel to an inclined portion of the second coil ends 221d near the second rectilinear portion 221b to a center between the columns of first and second rectilinear portions 221a and 221b, and then extends outward in a longitudinal direction of the first and second rectilinear portions 221a and 221b.

Two first coil ends 221c are each displaced radially outward by a distance 4×d at first top portions 221e (not shown), and the other two first coil ends 221c are each displaced radially outward by a distance 2×d at first top portions 221e (not shown). One second coil end 221d is displaced radially inward by a distance 2×d at a second top portion 221f (not shown), and two second coil ends 221d are displaced radially outward by a distance 2×d at second top portions 221f (not shown).

Second winding bodies 222B include: four first rectilinear portions 222a that are housed in a first layer, a third layer, a ninth layer, and a thirteenth layer of a slot 13 on a first side of six consecutive teeth 12b; four second rectilinear portions 222b that are housed in a fifth layer, a seventh layer, an eleventh layer, and a fifteenth layer of a slot 13 on a second side of the six consecutive teeth 12b; and first and second coil ends 222c and 222d that alternately link first longitudinal ends to each other and second longitudinal ends to each other between columns of the first and second rectilinear portions 222a and 222b. Moreover, the first and second rectilinear portions 222a and 222b are housed in the slots 13 such that long sides of the oblong cross sections are oriented in a circumferential direction.

Also included are: a winding end 222h (not shown) that extends from a second end of the first rectilinear portion 222a that is positioned in the first layer of the slot 13 on the first side in an opposite direction to the second coil ends 222d approximately parallel to an inclined portion of the second coil ends 222d near the second rectilinear portion 222b to a length that is approximately equal to the inclined portion in question, and then extends outward in a longitudinal direction of the first and second rectilinear portions 222a and 222b; and a winding end 222g (not shown) that extends from a second end of the second rectilinear portion 222b that is positioned in the fifteenth layer of the slot 13 on the second side in an opposite direction to the second coil ends 222d approximately parallel to an inclined portion of the second coil ends 222d near the first rectilinear portion 222a to a length that is approximately equal to the inclined portion in question, and then extends outward in a longitudinal direction of the first and second rectilinear portions 222a and 222b.

Two first coil ends 222c are each displaced radially outward by a distance 4×d at first top portions 222e (not shown), and the other two first coil ends 222c are each displaced radially outward by a distance 2×d at first top portions 222e (not shown). One second coil end 222d is displaced radially inward by a distance 2×d at a second top portion 222f (not shown), and two second coil ends 222d are displaced radially outward by a distance 2×d at second top portions 222f (not shown).

The first winding bodies 221B and the second winding bodies 222B that are produced in this manner are assembled into two-lane winding bodies 22B by mounting the second winding bodies 222B to the first winding bodies 221B while rotating them in a similar or identical manner to Embodiment 1. In the two-lane winding bodies 22B that are assembled in this manner, the respective orbiting portions that are constituted by the first and second rectilinear portions 221a and 221b, the first and second coil ends 221c and 221d, and the first and second top portions 221e and 221f of the first winding body 221B, and the respective orbiting portions that are constituted by the first and second rectilinear portions 222a and 222b, the first and second coil ends 222c and 222d, and the first and second top portions 222e and 222f of the second winding body 222B, are stacked together in the direction of arrangement of the first and second rectilinear portions 221a, 221b, 222a, and 222b (radially) so as to contact each other or be in close proximity.

In Embodiment 3, the first and second winding bodies 221B and 222B are configured so as to have helical shapes by winding a conductor wire for four turns. Then, the first and second winding bodies 221B and 222B are assembled such that the respective orbiting portions of the first winding bodies 221B and the respective orbiting portions of the second winding bodies 222B are stacked together in the direction of arrangement of the first and second rectilinear portions 221a, 221b, 222a, and 222b so as to contact each other or be in close proximity to assemble the two-lane winding bodies 22B.

Because the first and second winding bodies 221B and 222B are configured such that the first and second coil ends 221c, 222c, 221d, and 222d are displaced by the first and second top portions 221e, 222e, 221f, and 222f by 4×d or 2×d radially, the two-lane winding bodies 22B can be arranged circumferentially at a pitch of one slot without interference, improving assembly of the winding assembly.

The amount of radial displacement at the first and second top portions 221e, 222e, 221f, and 222f of the first and second winding bodies 221B and 222B is less than a total sum (8×d) of the radial dimensions of the first and second rectilinear portions 221a, 222a, 221b, and 222b that constitute one two-lane winding body 22B that is housed inside the slots 13. Thus, radial and axial dimensions of the coil end groups can be reduced, enabling the rotary electric machine to be reduced in size.

Now, in each of the above embodiments, the amount of radial displacement at the first and second top portions is given as 2×d or 4×d, but from the viewpoint of reductions in size of the radial and axial dimensions of the coil end groups, the amount of radial displacement at the first and second top portions need only be more less than the total sum of the radial dimensions of the first and second rectilinear portions that constitute a single two-lane winding body that is housed inside the slots. In other words, if m is the number of turns in the first and second winding bodies that constitute the two-lane winding bodies, where m is a natural number that is greater than or equal to two, then the amount of radial displacement at each of the top portions should be approximately a×d, where a is a natural number that is greater than or equal to 2 and less than or equal to 2(m−1), and d is a radial thickness of the rectilinear portions.

Moreover, each of the above embodiments has been explained using a stator, but the armature is not limited to a stator, and similar or identical effects are also obtained if the present application is applied to a rotor where the rotor is a wound rotor.

In each of the above embodiments, an eight-pole forty-eight-slot rotary electric machine has been explained, but it goes without saying that the number of poles and the number of slots are not limited to eight poles and forty-eight slots.

Furthermore, the slots are formed at a ratio of two slots per phase per pole, but the number of slots per phase per pole is not limited to two, and may be one, or may be three or greater.

In each of the above embodiments, the pitch between the columns of first and second rectilinear portions of the winding bodies is explained as being an angular pitch of six slots (a pitch of one magnetic pole), but the pitch between the columns of first and second rectilinear portions of the winding bodies is not limited to a pitch of one magnetic pole.

In each of the above embodiments, a rotary electric machine such as an electric motor or a generator has been explained, but the present invention can be applied to a direct acting machine such as a linear motor. An armature core of a direct acting machine is produced so as to have a long flat shape, and slots are formed at a uniform pitch in a longitudinal direction so as to each open on a first surface side of the armature core, for example. The armature of the direct acting machine is configured such that two-lane winding bodies are arranged in a direction of slot arrangement at a pitch of one slot so as to each be housed in a pair of slots that are separated by a pitch of one magnetic pole, for example. Moreover, the direction of slot arrangement and a slot depth direction in the direct acting machine correspond to the circumferential direction and the radial direction of the rotary electric machine.

The invention claimed is:

1. A rotary electric machine comprising an armature that is formed by mounting an armature winding to an annular armature core, wherein:
   a first winding body and a second winding body are each configured so as to have a helical shape in which end portions of rectilinear portions are linked by coil ends, by winding a jointless, continuous conductor wire that is coated with insulation for m turns, where m is a natural number that is greater than or equal to two;
   a two-lane winding body is configured by assembling said first winding body and said second winding body such that orbiting portions that are constituted by said rectilinear portions and said coil ends of said first winding body overlap entirely in a radial direction with corresponding orbiting portions that are constituted by said rectilinear portions and said coil ends of said second winding body;
   said armature winding is configured by mounting said two-lane winding bodies into respective pairs of slots of said armature core that are separated by a predetermined number of slots;
   said coil ends include a top portion that displaces by a predetermined amount in a radial direction at an approximately central portion between said linked rectilinear portions; and
   said radial displacement at said top portion is approximately a×d, where a is a natural number that is greater than or equal to 2 and less than or equal to 2×(m−1), and d is a radial thickness of said rectilinear portions that are housed inside said slots, 4×m of said rectilinear portions of two of said two-lane winding bodies being housed inside said slots so as to line up in single columns in a radial direction.

2. The rotary electric machine according to claim 1, wherein a plurality of terminals that constitute an electric power supplying portion and a neutral point of said armature winding each protrude at a first axial end of said armature winding from a radially outer side or a radially inner side and are arranged in a single row circumferentially.

3. A method for manufacturing an armature for the rotary electric machine according to claim 2, wherein said two-lane winding body is produced by bending and forming two of said conductor wires simultaneously so as to be stacked together to assemble said first winding body and said second winding body.

4. A method for manufacturing an armature for the rotary electric machine according to claim 2, wherein said method for manufacturing an armature comprises steps of:
   producing said first winding body and said second winding body separately; and
   mounting said second winding body inside said first winding body by inserting an orbiting portion of said second winding body that is positioned at a first end in a direction of arrangement of said rectilinear portions between two orbiting portions of said first winding body that are positioned at a second end in said direction of arrangement of said rectilinear portions, and then rotating said second winding body.

5. The rotary electric machine according to claim 1, wherein:
   winding ends of said first winding bodies each extend circumferentially inward relative to said first winding bodies after emerging from said slots at a first axial end, and winding ends of said second winding bodies are configured so as to extend circumferentially outward relative to said second winding bodies after emerging from said slots at said first axial end; and
   end portions of said winding ends of said second winding bodies of said two-lane winding bodies are configured so as to be stacked radially together with end portions of said winding ends of said first winding bodies of other two-lane winding bodies that are positioned in a direction of extension of said winding ends.

6. The rotary electric machine according to claim 5, wherein a plurality of terminals that constitute an electric power supplying portion and a neutral point of said armature winding each protrude at a first axial end of said armature winding from a radially outer side or a radially inner side and are arranged in a single row circumferentially.

7. A method for manufacturing an armature for the rotary electric machine according to claim 6, wherein said two-lane winding body is produced by bending and forming two of said conductor wires simultaneously so as to be stacked together to assemble said first winding body and said second winding body.

8. A method for manufacturing an armature for the rotary electric machine according to claim 6, wherein said method for manufacturing an armature comprises steps of:
producing said first winding body and said second winding body separately; and
mounting said second winding body inside said first winding body by inserting an orbiting portion of said second winding body that is positioned at a first end in a direction of arrangement of said rectilinear portions between two orbiting portions of said first winding body that are positioned at a second end in said direction of arrangement of said rectilinear portions, and then rotating said second winding body.

9. The rotary electric machine according to claim 5, wherein connection of winding ends of said first winding bodies and said second winding bodies is completed on a radially outer side and a radially inner side of said armature winding.

10. The rotary electric machine according to claim 9, wherein a plurality of terminals that constitute an electric power supplying portion and a neutral point of said armature winding each protrude at a first axial end of said armature winding from a radially outer side or a radially inner side and are arranged in a single row circumferentially.

11. A method for manufacturing an armature for the rotary electric machine according to claim 10, wherein said two-lane winding body is produced by bending and forming two of said conductor wires simultaneously so as to be stacked together to assemble said first winding body and said second winding body.

12. A method for manufacturing an armature for the rotary electric machine according to claim 10, wherein said method for manufacturing an armature comprises steps of:
producing said first winding body and said second winding body separately; and
mounting said second winding body inside said first winding body by inserting an orbiting portion of said second winding body that is positioned at a first end in a direction of arrangement of said rectilinear portions between two orbiting portions of said first winding body that are positioned at a second end in said direction of arrangement of said rectilinear portions, and then rotating said second winding body.

13. A method for manufacturing an armature for the rotary electric machine according to claim 9, wherein said two-lane winding body is produced by bending and forming two of said conductor wires simultaneously so as to be stacked together to assemble said first winding body and said second winding body.

14. A method for manufacturing an armature for the rotary electric machine according to claim 9, wherein said method for manufacturing an armature comprises steps of:
producing said first winding body and said second winding body separately; and
mounting said second winding body inside said first winding body by inserting an orbiting portion of said second winding body that is positioned at a first end in a direction of arrangement of said rectilinear portions between two orbiting portions of said first winding body that are positioned at a second end in said direction of arrangement of said rectilinear portions, and then rotating said second winding body.

15. A method for manufacturing an armature for the rotary electric machine according to claim 5, wherein said two-lane winding body is produced by bending and forming two of said conductor wires simultaneously so as to be stacked together to assemble said first winding body and said second winding body.

16. A method for manufacturing an armature for the rotary electric machine according to claim 5, wherein said method for manufacturing an armature comprises steps of:
producing said first winding body and said second winding body separately; and
mounting said second winding body inside said first winding body by inserting an orbiting portion of said second winding body that is positioned at a first end in a direction of arrangement of said rectilinear portions between two orbiting portions of said first winding body that are positioned at a second end in said direction of arrangement of said rectilinear portions, and then rotating said second winding body.

17. A method for manufacturing an armature for the rotary electric machine according to claim 1, wherein said two-lane winding body is produced by bending and forming two of said conductor wires simultaneously so as to be stacked together to assemble said first winding body and said second winding body.

18. A method for manufacturing an armature for the rotary electric machine according to claim 1, wherein said method for manufacturing an armature comprises steps of:
producing said first winding body and said second winding body separately; and
mounting said second winding body inside said first winding body by inserting an orbiting portion of said second winding body that is positioned at a first end in a direction of arrangement of said rectilinear portions between two orbiting portions of said first winding body that are positioned at a second end in said direction of arrangement of said rectilinear portions, and then rotating said second winding body.

\* \* \* \* \*